(12) United States Patent
Maier et al.

(10) Patent No.: US 9,883,004 B2
(45) Date of Patent: Jan. 30, 2018

(54) SYSTEMS AND METHODS FOR GENERATING A VIEWER-SPECIFIC VISITOR HISTORY FOR A LOCATION

(71) Applicant: Google Inc., Mountain View, CA (US)

(72) Inventors: Zachary Paul Maier, New York, NY (US); David Weissman, Union City, NJ (US); Radhika Lakshmanan, New York, NY (US); Richard Oliver Frankel, Livingston, NJ (US); Doug DeCarlo, New York, NY (US); Mikhail Lopyrev, San Francisco, CA (US); Julia Kodysh, Brooklyn, NY (US); Catherine Ye, Edison, NJ (US); Jeffrey Korn, New York, NY (US)

(73) Assignee: Google LLC, Mountain View, CA (US)

( * ) Notice: Subject to any disclaimer, the term of this patent is extended or adjusted under 35 U.S.C. 154(b) by 198 days.

(21) Appl. No.: 14/088,988

(22) Filed: Nov. 25, 2013

(65) Prior Publication Data
US 2015/0172411 A1    Jun. 18, 2015

(51) Int. Cl.
*H04L 29/08* (2006.01)
*H04W 4/02* (2009.01)
*H04W 4/20* (2009.01)
*G06Q 30/02* (2012.01)

(52) U.S. Cl.
CPC ........... *H04L 67/306* (2013.01); *G06Q 30/02* (2013.01); *H04W 4/02* (2013.01); *H04W 4/023* (2013.01); *H04W 4/206* (2013.01)

(58) Field of Classification Search
CPC ........ G06Q 30/02; H04W 4/02; H04W 4/023; H04W 4/206
See application file for complete search history.

(56) References Cited

U.S. PATENT DOCUMENTS

| | | | |
|---|---|---|---|
| 7,593,740 B2 * | 9/2009 | Crowley | H04L 12/58 455/414.2 |
| 8,019,692 B2 | 9/2011 | Rosen | |
| 2005/0135584 A1 * | 6/2005 | Thomas | H04M 9/001 379/167.01 |
| 2006/0085419 A1 | 4/2006 | Rosen | |
| 2006/0294192 A1 * | 12/2006 | Mao | H04L 67/306 709/213 |
| 2009/0310938 A1 * | 12/2009 | Yoo | G11B 27/034 386/239 |
| 2010/0023506 A1 | 1/2010 | Sahni et al. | |

(Continued)

*Primary Examiner* — Ninos Donabed
(74) *Attorney, Agent, or Firm* — Dority & Manning, P.A.

(57) ABSTRACT

Systems and methods for generating a viewer-specific visitor history for a location are provided. In particular, a visitor history for a particular viewer and location can indicate a total number of users who have visited the location and can specifically identify one or more of a set of users using a facepile. The set of specifically identified users can be those users that have an associative link with the viewer and that are also associated with at least one location signal for the given location and for which the particular viewer is a permitted viewer. Thus, location signals having varying scopes of visibility information can be aggregated across a plurality of different web-services to provide a single, unified visitor history for a particular location and viewer, all while respecting user-specified visibility information.

19 Claims, 14 Drawing Sheets

(56) References Cited

U.S. PATENT DOCUMENTS

| | | |
|---|---|---|
| 2011/0196926 A1* | 8/2011 | Crawford ............... G06Q 30/02 |
| | | 709/204 |
| 2012/0109752 A1* | 5/2012 | Strutton ............. G06Q 30/0261 |
| | | 705/14.58 |
| 2012/0110052 A1 | 5/2012 | Smarr et al. |
| 2012/0110076 A1 | 5/2012 | Su et al. |
| 2012/0110088 A1 | 5/2012 | Su et al. |
| 2012/0110096 A1 | 5/2012 | Smarr et al. |
| 2012/0323909 A1 | 12/2012 | Behforooz et al. |
| 2013/0013689 A1* | 1/2013 | Crawford ................ H04L 67/24 |
| | | 709/204 |
| 2013/0111354 A1 | 5/2013 | Marra et al. |
| 2013/0124504 A1 | 5/2013 | Haugen et al. |
| 2013/0246139 A1* | 9/2013 | Hardman ........... G06Q 30/0224 |
| | | 705/14.16 |

\* cited by examiner

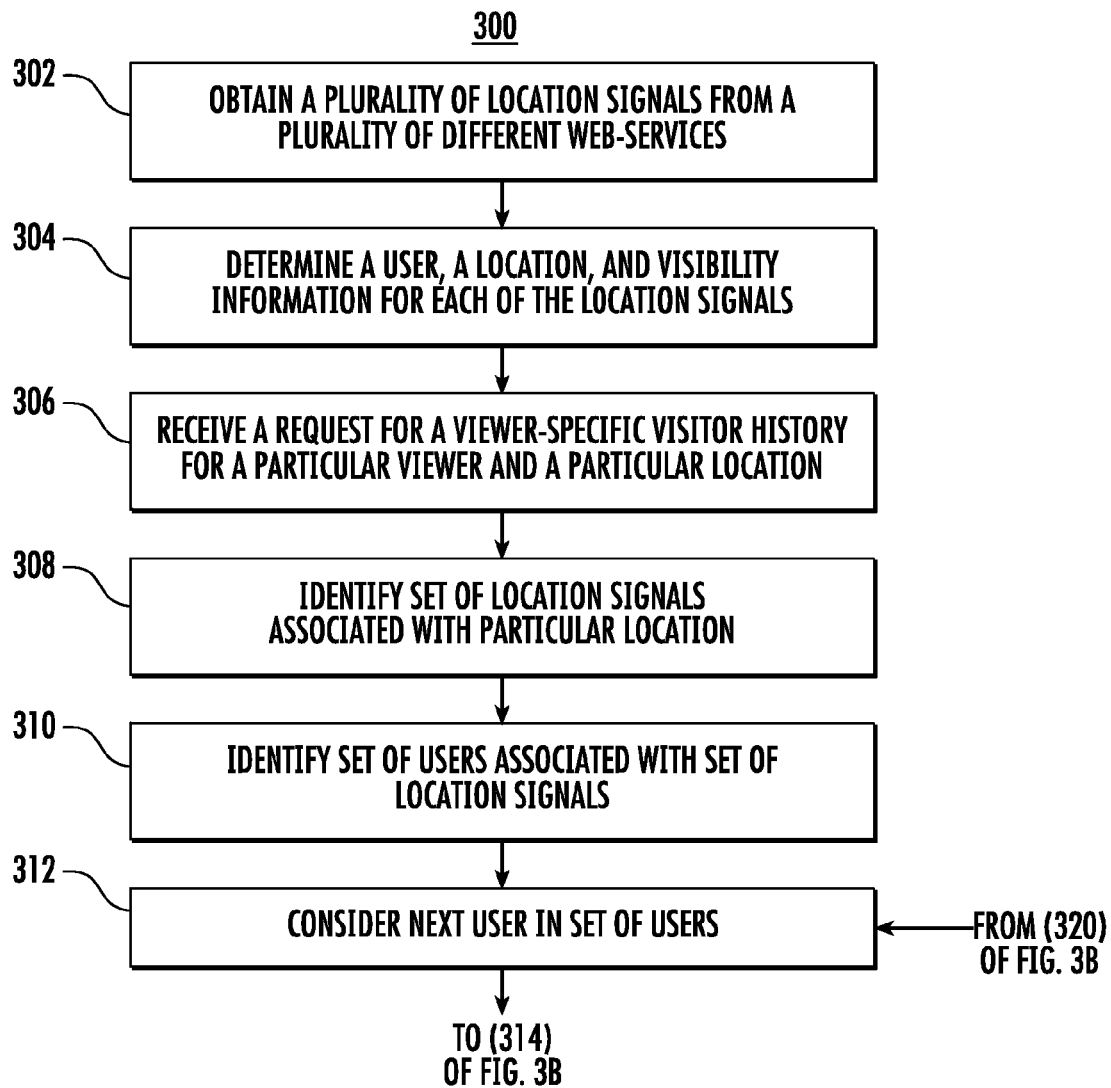

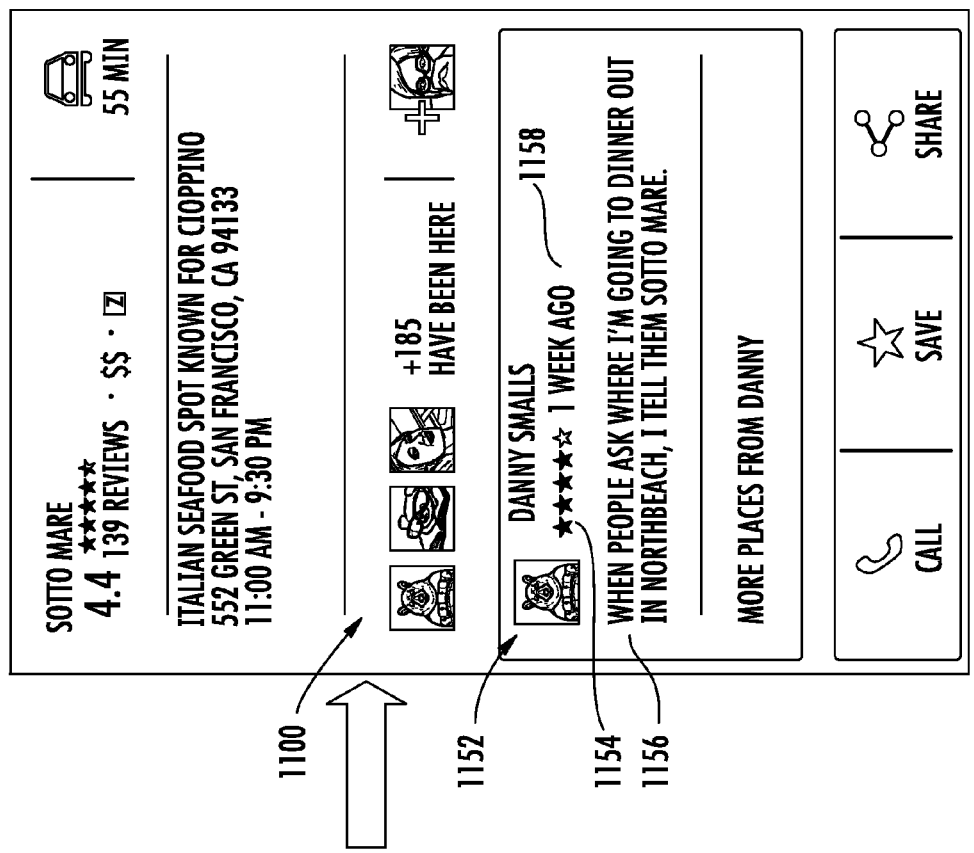
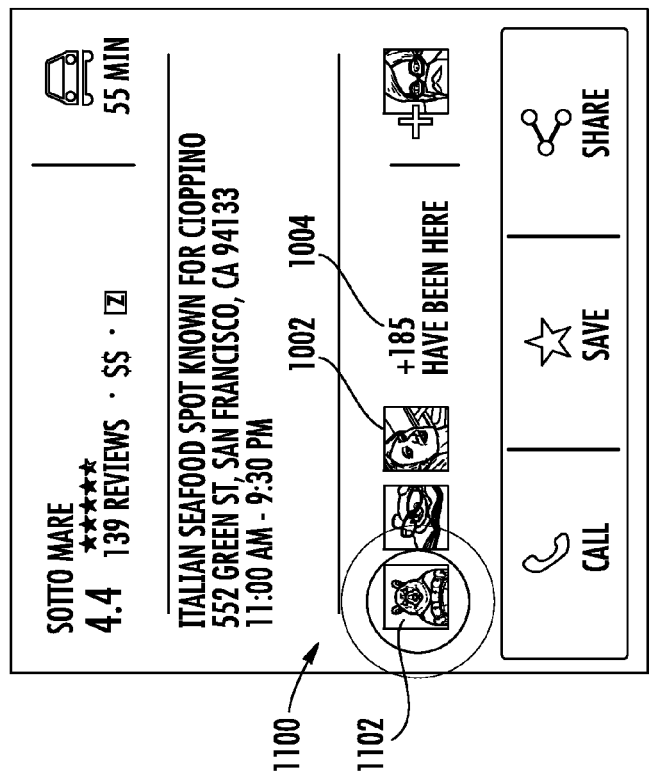
FIG. 11

SYSTEMS AND METHODS FOR GENERATING A VIEWER-SPECIFIC VISITOR HISTORY FOR A LOCATION

FIELD

The present disclosure is generally directed to systems and methods for generating a viewer-specific visitor history for a location. More particularly, the present disclosure is directed to systems and methods for aggregating a plurality of location signals from a plurality of different web-services to generate and provide viewer-specific visitor histories for various locations.

BACKGROUND

An increasing number of web-services leverage location data describing the current or past location of a user to provide an enhanced or improved user experience. As an example, certain social media platforms can allow users to check-in to a particular location to inform their contacts of their current location. As another example, certain social media platforms can allow users to tag their postings or updates with their current location so as to share a more robust depiction of their current activities. As yet another example, certain web-services can permit users to provide a review, rating, or other feedback concerning a particular point of interest such as, for example, a restaurant, music venue, or other point of interest that the user has recently visited.

Furthermore, users can visit certain web-services to view the location-associated data available from their friends or contacts with the goal of making more informed decisions or staying up to date on social activities. For example, a user might visit a web-service with the goal of selecting among several restaurants based on which of such restaurants has been visited more times by their friends or contacts. Thus, the collection and presentation of location-associated data is a growing component of various web-services providing different functionality and user experiences.

However, one problem associated with the increasing number of web-services leveraging location data is that such location data remains segmented among the web-services. For example, the user hoping to select a restaurant based on number of past visits by friends or contacts may not be able to obtain a complete visitor history of each restaurant unless the user visits several web-services or social media platforms. In particular, the user may have to visit a first web-service to identify which of her friends have uploaded a post from a given restaurant. The user may then have to visit a second web-service to determine the number of friends that have checked-in to the given restaurant and then visit yet a third web-service to read reviews of the restaurant provided by her friends.

The challenge presented by segmentation of location-associated data across multiple web-services is compounded by the fact that each location signal from each web-service is frequently subject to specific visibility settings and expectations, respect for which is an essential component of a positive user experience.

In particular, certain web-services can provide each user with an opportunity to control which other users or persons can view or otherwise interact with their particular postings or activities. For example, a user that interacts with a web-service to check-in to a restaurant may indicate that only a certain set of other users of such web-service can be informed of such check-in. Therefore, aggregation and presentation of location signals across various web-services having varying levels of visibility information is particularly challenging.

SUMMARY

Aspects and advantages of embodiments of the present disclosure will be set forth in part in the following description, or may be obvious from the description, or may be learned through practice of the embodiments.

One aspect of the present disclosure is directed to a computer-implemented method for providing a viewer-specific visitor history for a particular location. The method includes obtaining, by one or more computing devices, a plurality of location signals from a plurality of different web-services. The method includes determining, by the one or more computing devices, a user, a location, and visibility information for each of the plurality of location signals, wherein the visibility information for each of the plurality of location signals defines a set of permitted viewers. The method includes receiving, by the one or more computing devices, a request for the viewer-specific visitor history for a particular viewer and the particular location. The method includes determining, by the one or more computing devices, a number of users that have visited the particular location based on the plurality of location signals. The method includes identifying a subset of the number of users, wherein the subset comprises those users associated with at least one location signal for which the particular viewer is a permitted viewer and that is associated with the particular location. The method includes providing, by the one or more computing devices, the viewer-specific visitor history for display to the particular viewer, wherein the viewer-specific visitor history identifies one or more of the subset of the number of users.

These and other features, aspects and advantages of the present disclosure will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

A detailed discussion of embodiments of the present disclosure directed to one of ordinary skill in the art is set forth in the specification, which makes reference to the appended figures, in which:

FIGS. 3A and 3B depict a flow chart of an exemplary method for generating a viewer-specific visitor history according to an exemplary embodiment of the present disclosure;

FIG. 11 depicts an exemplary viewer-specific visitor history according to an exemplary embodiment of the present disclosure;

DETAILED DESCRIPTION

Figure 1:
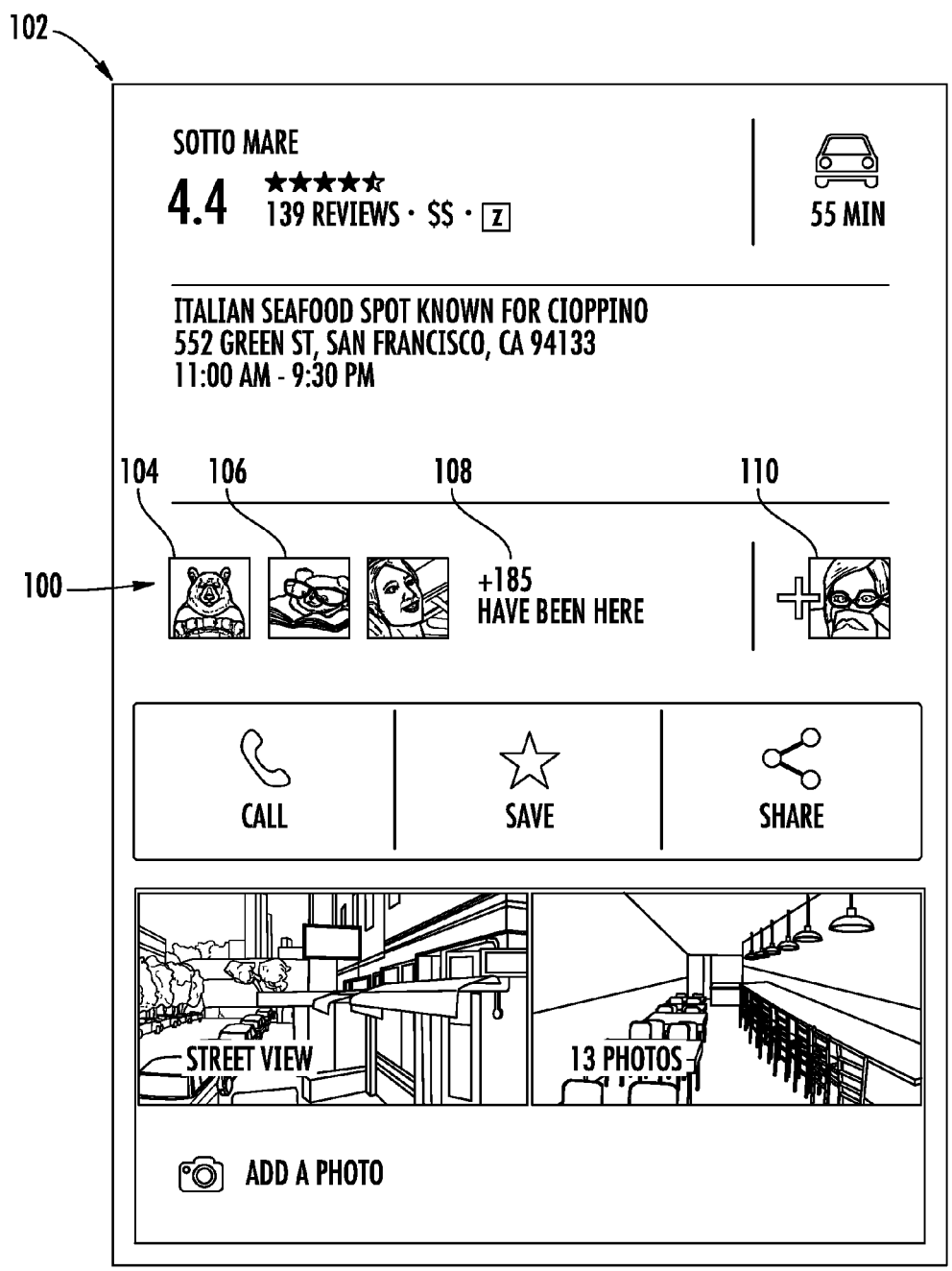
FIG. 1 depicts an exemplary viewer-specific visitor history for a location according to an exemplary embodiment of the present disclosure.

Reference now will be made in detail to embodiments of the present disclosure, one or more examples of which are illustrated in the drawings. Each example is provided by way of explanation of embodiments, not limitation of the present disclosure. In fact, it will be apparent to those skilled in the art that various modifications and variations can be made to embodiments without departing from the scope or spirit of the present disclosure. For instance, features illustrated or described as part of one embodiment can be used with another embodiment to yield a still further embodiment.

Generally, the present disclosure is directed to systems and methods for aggregating a plurality of location signals from a plurality of different web-services to generate and provide viewer-specific visitor histories for various locations. In particular, a visitor history for a particular viewer and location can indicate a total number of users who have visited the location and can specifically identify one or more of a set of users. The set of specifically identified users can be those users that have an associative link with the viewer and that are also associated with at least one location signal for the given location and for which the particular viewer is a permitted viewer. Thus, location signals having varying scopes of visibility information can be aggregated across a plurality of different web-services to provide a single, unified visitor history for a particular location and viewer, all while respecting the user-specified visibility information.

According to an aspect of the present disclosure, a plurality of location signals can be respectively obtained from a plurality of different web-services. For example, the different web-services can include one or more social media platforms or websites, a review website, a cloud-based email client, a personal assistant system, a mapping application or other geographic information system, a third-party application or web-service that uses location-associated data, or other web-services. The plurality of location signals can be reported to a central system by the various web-services or can be culled by the central system from available data.

The plurality of location signals can include any location-associated data provided by the different web-services. As examples, location signals can include reviews of a particular restaurant, check-ins at a particular location, email reservations at a particular location, location-associated social media postings, or other location signals.

Importantly, in situations in which the systems and methods discussed herein collect information about users, such as location signals or associative links between users, the users may be provided with an opportunity to control whether programs or features collect such information. In addition, users can be provided with a tool to revoke or modify the scope of permissions. Furthermore, as discussed further herein, the systems and methods of the present disclosure obtain and analyze visibility information associated with each of the location signals, so that the provided visitor histories respect user-selected scopes of visibility.

A user, a location, and visibility information can be determined for each of the location signals. In particular, in some implementations, a plurality of database entries can be respectively generated and maintained for the plurality of location signals. The database entry for each location signal can specify the user, location, and visibility information associated with such location signal. In further implementations, each database entry can include further information such as an identification of the web-service from which such location signal was received and/or a pointer to an address at which the content of the location signal can be retrieved or viewed.

The visibility information for each location signal can define a scope of permitted viewers for such location signal. In particular, the different web-services from which the location signals are obtained may provide features that allow a user to define a set of permitted viewers of the associated content. For example, a social media user can provide a location-associated posting to the social media website, but can specify that only certain selected members of the social network be permitted to view the posting. As another example, a review website may have a default setting that all reviews are publically viewable, but may permit users to adjust such default setting. In some implementations, the visibility information for each location signal can include one or more access control list tags.

According to another aspect of the present disclosure, a viewer-specific visitor history can be generated for a particular location and viewer based on the plurality of location signals. As an example, the viewer-specific visitor history can indicate a total number of users that have visited the location and can specifically identify a subset of such users. In some implementations, the specifically identified users can be those users with which the viewer has an associative link and for which the viewer is permitted to view at least one of the user's associated location signals for the given location.

As an example, an individual that selects a particular restaurant in a mapping application can be presented with a visitor history which reads: "Zach, Rich, and 948 other people have been here." As another example, the visitor history can be a facepile that provides a plurality of images respectively associated with a plurality of users that have visited the location.

Importantly, the viewer must be a permitted viewer for at least one location signal associated with a user and the particular location in order for such user to be specifically identified by the visitor history for such location. In other words, a user will not be identified to the viewer as having visited a location unless the viewer is permitted to view at least one location signal that links such user to such location. In such fashion, varying scopes of visibility respectively associated with the plurality of location signals can be respected and can be used to assist in determining the contents of the visitor history.

In addition, in some implementations, an associative link must exist between the viewer and a user in order for the user to be specifically identified by the visitor history. An associative link can include an identifiable connection between the viewer and a user on one of the web-services. As an example, an associative link can be present if the viewer follows or is a friend or connection with a user on one or more social networking websites. As another example, if the viewer regularly sends a user emails or tags the user in one or more social media postings, then an associative link can be drawn between the viewer to the user. In such fashion, the users specifically identified by the visitor history can be limited to those users with whom the viewer is familiar or interested.

According to another aspect of the present disclosure, the visitor history may provide or include various interactive features. For example, if the viewer selects one of the specifically identified users, then the viewer can be provided with a summary of one or more of the location signals associated with the selected user and given location. For example, the summary can state that "Rich has checked-in here 13 times." As another example, the summary can provide a summarization of Rich's review of the location (e.g. "Great food but expensive, 4/5").

The visitor history can provide other interactive features as well. For example, the viewer can add herself as a visitor to the location by indicating that she has been to the location or by providing a review of the location. As another example, the viewer can view a list of all specifically identifiable users who have been to the location. Thus, the visitor history can be an interactive tool that allows the viewer to explore how her contacts have interacted with a location.

With reference now to the FIGS., exemplary embodiments of the present disclosure will be discussed in greater detail. FIG. 1 depicts an exemplary viewer-specific visitor history 100 for a location according to an exemplary embodiment of the present disclosure. In particular, FIG. 1 depicts visitor history 100 displayed as a feature of a place card 102 for an Italian restaurant. For example, place card 102 can be provided by a mapping application in response to selection of the Italian restaurant by a user in the context of a point of interest search within the mapping application for Italian restaurants in San Francisco.

Viewer-specific visitor history 100 can identify one or more users that have previously visited the particular location. In particular, as depicted in FIG. 1, visitor history 100 can be a facepile that provides a plurality of images respectively associated with a plurality of users, including, for example, images 104 and 106. As an example, the image provided to identify each user can be a profile picture associated with such user in one or more social media platforms.

Viewer-specific visitor history 100 can further include a visitor count 108. The visitor count 108 can indicate a total number of users that have visited a location. For example, as shown in FIG. 1, the visitor count 108 can be an additional count that indicates a number of additional users that have visited the location in addition to those specifically identified by the facepile images of visitor history 100. As another example, the visitor count can be a global count that exactly identifies the total number of users that have visited the location.

In addition, visitor history 100 can provide or include a button 110 by which the viewer can indicate that she has visited the location. The operation of this and other interactive features of visitor history 100 will be discussed in further detail below. However, as an example, in some implementations, the viewer can be permitted to select one of the images (e.g. image 104) and, in response, can be presented with a summary of one or more location signals that link the user represented by image 104 to the particular location. For example, in response to selecting image 104 the viewer can be provided with the review of the Italian restaurant left by the user represented by image 104.

Thus, by viewing and/or interacting with a plurality of visitor histories for various locations, the viewer can quickly obtain an intuitive sense for how many people have visited each of the various locations and, in addition, a sense for which of her contacts have visited each location and whether they enjoyed their visit.

In addition, the layout and features of place card 102 and visitor history 100 are exemplary in nature. The systems and methods of the present disclosure can be implemented to provide visitor histories according to any desirable format or visualization. As examples, in addition to providing internal and external photographs or panoramas of the location, a visitor history and/or place card for a particular location can include information such as a link to a website of the location, a menu if the location is a restaurant, hours of operations, reviews from professional review sources, an opportunity to receive directions, a summary of one or more user-reviews, a widget by which the viewer can leave a review, or other interactive features.

Further, visitor histories are in no way limited to use in conjunction with place cards provided by a mapping application. Instead, visitor histories can be provided or displayed in conjunction with any application or user interface that provides information about a particular location.

Figure 2:
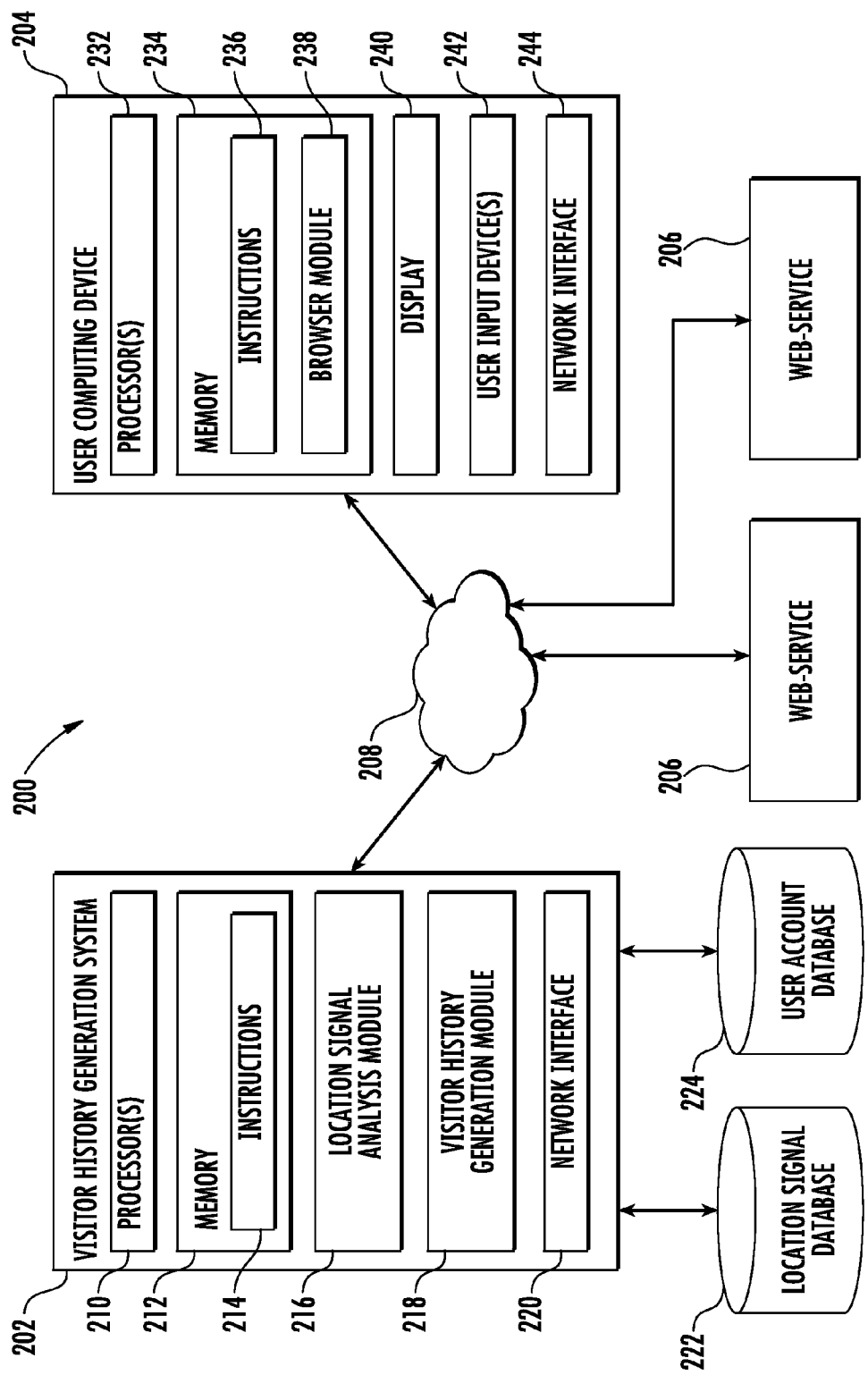
FIG. 2 depicts an exemplary system for generating viewer-specific visitor histories according to an exemplary embodiment of the present disclosure.

FIG. 2 depicts an exemplary system 200 for generating viewer-specific visitor histories according to an exemplary embodiment of the present disclosure. In particular, system 200 can include a visitor history generation system 202, a user computing device 204, and two or more web-services 106 in communication with each other over a network 208.

Visitor history generation system 202 can be implemented using one or more computing devices, such as, for example, one or more servers. In particular, any computing tasks performed by visitor history generation system 202 can be performed by any combination of one or more computing devices connected in a parallel or distributed computing system.

Visitor history generation system 202 can include one or more processors 220 and a memory 212. Processor 220 can be any suitable processing device and can be one processor or a plurality of processors which are operably connected. Memory 212 can store instructions 214 that cause processor 220 to perform operations to implement the present disclosure.

Visitor history generation system 202 can also include a number of modules, including, for example, location signal analysis module 216 and visitor history generation module 218. Visitor history generation system 202 can implement location signal analysis module 216 to receive or obtain and analyze a plurality of location signal from the two or more web-services 206.

As an example, in some implementations, visitor history generation system 202 can implement location signal analysis module 216 to determine a user, location, and visibility information for each of the plurality of obtained location signals. As another example, in some implementations, visitor history generation system 202 can implement location signal analysis module 216 to create a database entry for each location signal. For example, the database entries can be stored in a location signal database 222.

Visitor history generation system 202 can implement visitor history generation module 218 to generate a viewer-specific visitor history for a particular location and viewer. As an example, in some implementations, visitor history generation system 202 can implement visitor history generation module 218 to analyze a plurality of database entries obtained from location signal database 222 to identify a set of users which are permitted to be specifically identified by the visitor history.

It will be appreciated that the term "module" refers to computer logic utilized to provide desired functionality. Thus, a module can be implemented in hardware, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM, hard disk or optical or magnetic media. When software is used, any suitable programming language or platform can be used to implement the module.

Furthermore, while location signal analysis module 216 and visitor history generation module 218 are depicted in FIG. 2 as separate modules or components of visitor history generation system 202, in some implementations such modules can be combined to form a single module or distributed to form several additional modules.

Visitor history generation system 202 can also include a network interface 220 for communicating over network 208. Network interface 220 can include any suitable components for interfacing with one more networks, including for example, transmitters, receivers, ports, controllers, antennas, or other suitable components.

Visitor history generation system 202 can include or otherwise be in communication with any number of databases, including, for example, location signal database 222 and user account database 224. It will be appreciated that databases 222 and 224 or other data storage functionality can be implemented using a single database or can be distributed across a plurality of storage devices. Further, databases 222 and 224 can be located locally or located remotely and accessed over a network.

Location signal database 222 can store a plurality of database entries respectively corresponding to a plurality of location signals. For example, for each location signal obtained by visitor history generation system 202, a corresponding database entry can be created in location signal database 222. Each database entry can specify a user, a location, and visibility information.

In further implementations, each database entry can specify further information such as, for example, the web-service 206 from which the corresponding location signal was obtained and a pointer to an address at which an item of content associated with the location signal can be obtained or viewed. Furthermore, in some implementations, visitor history generation system 202 can receive updates or changes to the visibility information which can be retroactively applied to the database entries stored in location signal database 222.

User account database 224 can store data linking each of a plurality of users to a plurality of user accounts. In particular, a single user may employ a plurality of different service-specific accounts to interact with a plurality of different web-services. For example, a user can have a first service-specific account for a social media website and a second service-specific account for a mapping application. As such, a user account database 224 can be maintained which provides a mapping of service-specific accounts to particular users. For example, user account database 244 can include a plurality of different service-specific accounts associated with a user identifier that identifies a particular user.

Importantly, however, in situations in which the systems and methods discussed herein collect information about users, such as user account information, the users may be provided with an opportunity to control whether programs or features collect such information. In addition, users can be provided with a tool to revoke or modify the scope of permissions.

User computing device 204 can be a computing device having a processor 232 and a memory 234. As examples, user computing device 204 can be a wireless mobile device, a personal digital assistant (PDA), smartphone, tablet, laptop computer, desktop computer, computing-enabled watch, computing-enabled eyeglasses, a wearable computing device, embedded computing system, home appliances, or any other computing device.

Processor 232 of user computing device 204 can be any suitable processing device and can be one processor or a plurality of processors that are operably connected. Memory 234 can include any number of computer-readable instructions 238 or other stored data. For example, memory 234 can include, store, or provide a browser module 236. When implemented by processor 232, browser module 236 can cause or instruct processor 232 to run a web browser application.

It will be appreciated that user computing device 204 can further include any number of other application modules to perform any number of applications to provide additional functionality. In addition, instructions 238 can provide functionality for performing operations according to various programming languages, platforms, layers, or communications techniques.

User computing device 204 can include or be in communication with a display 240 for displaying information to the user. Further, user computing device 204 can include any number of user input devices 242, such as, for example, a keyboard, a mouse, a microphone, a touch-sensitive screen, motion sensors, a touch-pad, a keyboard stick, buttons, or other suitable controls.

User computing device 204 can further include a network interface 244. Network interface 244 can include any suitable components for interfacing with one more networks, including for example, transmitters, receivers, ports, controllers, antennas, or other suitable components.

Although only one user computing device 204 is depicted in FIG. 2, one of skill in the art will understand that any number of unique user computing devices 204 respectively associated with any number of unique users can be included in system 200.

Web-services 206 can be any web-service that generates or provides location signals based on data associated with one or more users. As examples, web-services 206 can include a social media platform or website, a cloud-based email client, a mapping application or other geographic information system, an event ticket purchasing service, a personal assistant system, a review website, a navigation application, a photograph storage application, a third-party application or web-service that uses location-associated data, or any arbitrary location-aware web-service. Further, in some implementations, visitor history generation system 202 and certain of web-services 206 can be provided by a single entity.

In some implementations, web-services 206 can actively provide location signals to visitor history generation system 202. In other implementations, visitor history generation system 202 can cull the location signals from available web-services data.

Exemplary location signals can include a check-in to a restaurant by a user, a location-tagged posting by a user in a social media network, a review of a given point of interest by a user, an indication by a viewer of a visitor history that they have visited the particular location, a user-confirmed tagging of the user by another user at a particular location, reservations included in an email, requested directions or historical location data from a mapping application, meta-tags included with a photograph or other item of content, location updates from a user computing device 204, a social media posting with text or image data indicating a current or past location, or any other location-associated data that indicates that a user is currently or has previously visited a location.

Importantly, however, in situations in which the systems and methods discussed herein collect information about users, such as the exemplary location signals discussed above, the users may be provided with an opportunity to control whether programs or features collect such information. In addition, users can be provided with a tool to revoke or modify the scope of permissions. Furthermore, as discussed further herein, the systems and methods of the present disclosure obtain and analyze visibility information associated with each of the location signals, so that the provided visitor histories respect user-selected scopes of visibility.

The network 208 can be any type of communications network, such as a local area network (e.g. intranet), wide area network (e.g. Internet), or some combination thereof. In general, communication between the visitor history generation system 202, user computing device 204, and web-services 206 can be carried using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

Figure 3B:
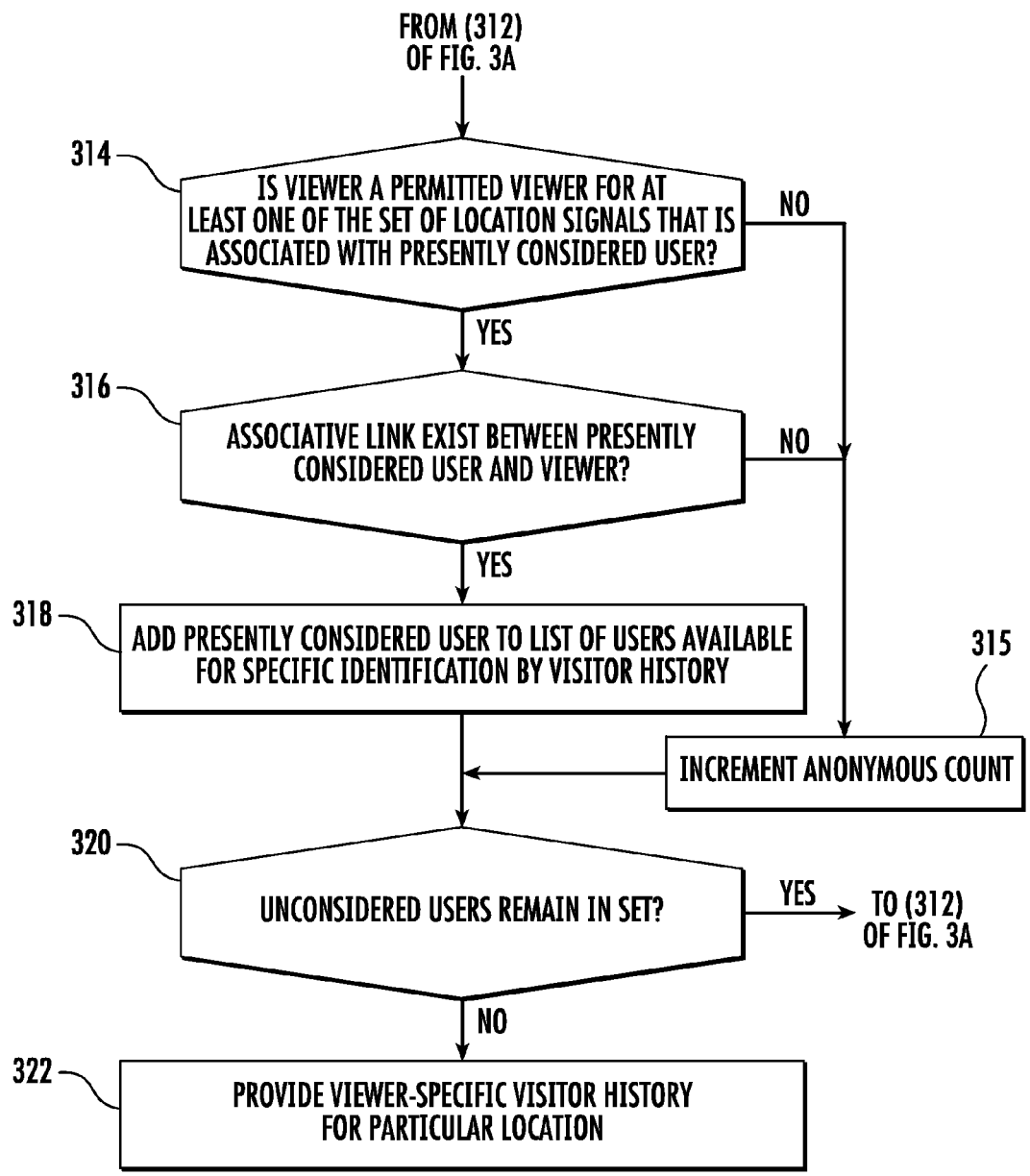

FIGS. 3A and 3B depict a flow chart of an exemplary method (300) for generating viewer-specific visitor histories according to an exemplary embodiment of the present disclosure. Method (300) can be implemented using any suitable computing system, including, for example, system 200 of FIG. 2.

In addition, although FIGS. 3A and 3B depict steps performed in a particular order for purposes of illustration and discussion, methods of the present disclosure are not limited to such particular order or arrangement. One skilled in the art, using the disclosures provided herein, will appreciate that various steps of the method (300) can be omitted, rearranged, combined, and/or adapted in various ways without deviating from the scope of the present disclosure.

At (302) a plurality of location signals can be obtained from a plurality of different web services. As an example, at (302) the plurality of different web-services can actively provide the location signals to one or more computers implementing method (300). As another example, at (302) one or more computers implementing method (300) can cull the location signals from available web-services data.

At (304) a user, a location, and visibility information can be determined for each location signal received at (302). In particular, each location signal can provide an indication that a user is currently visiting or has previously visited a location. As an example, if a user interacts with a social media platform to check-in to a location, then such check-in can be treated as a location signal linking the user to the location.

In some instances, each location signal can be actively analyzed to determine their respective locations at (304). In other instances, the web-service from which one or more of the location signals was obtained can have previously determined or identified a particular location associated with such location signal. Thus, in such implementations, determining the location at (306) can include receiving, identifying, acknowledging, retrieving, or storing the location that has been identified and provided by the web-service.

In some implementations, determining a user at (304) can include identifying the user based on user account information. In particular, a user might maintain a plurality of different service-specific accounts for the plurality of different web-services. For example, a user can have a first service-specific account for a social media website and a second service-specific account for a mapping application.

Thus, the location signal may identify only one of the plurality of different service-specific accounts. As such, at (304) a user account database can be consulted to determine the user associated with the particular service-specific account provided by the location signal. For example, a plurality of different service-specific accounts may be associated with a user identifier that identifies the particular user.

Further, different web-services can provide operability to allow a user to define a set of permitted viewers of the associated content. For example, the user checking in to the location can specify a certain set of other users and such information can be obtained at (304). As an example, the user may select one or more circles or other groupings of users that are permitted to view the content. Such user-selected scope of visibility can be determined and stored as the visibility information for a given location signal.

In some instances, a web-service may not provide tools to specify a scope of visibility. In such instances, a default visibility setting can be obtained at (304).

In some implementations, at (304) a database entry can be created for each location signal received at (302). For example, the database entry for each location signal can contain the user, location, and visibility information and can be stored in a location signal database. The resulting plurality of database entries can be searchable or otherwise sortable by user, by location, or by other relevant criteria. As an example, the visibility information for each location signal can be in the form one or more access control list files which are stored or referenced within the database entry for each location signal.

At (306) a request for a viewer-specific visitor history can be received. The request can specify a particular viewer and a particular location. As an example, the request for the viewer-specific visitor history can be received by a visitor history generation system from a web-service. More particularly, the web-service can send the request in response to a particular user seeking information about a location.

For example, a user of a mapping application can search for information concerning a particular restaurant while signed in to a user account. In response, the mapping application can send a request to a visitor history generation system that specifies the particular restaurant and the particular user that will be viewing the visitor history. As another example, the visitor history generation system can be integrated into a web-service and the request received at (306) can be received from a user.

At (308) a set of location signals associated with the particular location can be identified. As an example, a plurality of database entries in a location signal database can be searched, sorted, or otherwise analyzed to identify all database entries which specify the particular location.

In some implementations, identifying location signals associated with the particular location can include identifying a set of geographic coordinates associated with a particular point of interest or vice versa and identifying location signals associated with either the geographic coordinates or the particular point of interest. For example, location signals associated with a given point of interest may be identified by identifying location signals associated with the title of the point of interest (e.g. restaurant name), the address of the point of interest, or the latitude and longitude of the point of interest.

Further, such cross-referencing of point of interest title, address, and geocode can be performed at (308) as discussed above or can be performed at (304) when determining a location associated with each respective location signal.

At (310) a set of users can be identified. The set of users identified at (310) can be the set of unique users associated with the set of location signals identified at (308). As an example, each of the set of location signals identified at (308) can be analyzed to determine whether it provides a new user or is cumulative with respect other location signals included in the set of location signals identified at (308).

At (312) the next user in the set of users identified at (310) can be considered. For example, the set of users identified at (310) can be organized into a sequence according to any logic and can be considered in an individual fashion. After (312) method (300) proceeds to (314) of FIG. 3B.

Referring now to FIG. 3B, at (314) it can be determined whether the viewer specified by the request received at (306) is a permitted viewer for at least one location signal that is included in the set of location signals identified at (308) and that is associated with the presently considered user. In particular, the visibility information associated with each of such location signals can be analyzed to determine whether the viewer is a permitted viewer for at least one of such location signals.

If it is determined at (314) that the viewer is not a permitted viewer for at least one location signal that is included in the set of location signals identified at (308) and that is associated with the presently considered user, then method (300) can proceed to (315) and increment an anonymous count. In particular, in order to respect the visibility information associated with the location signals associated with presently considered user, the viewer-specific visitor history for such location should not specifically identify the presently considered user as having visited the particular location. Instead, an anonymous count can be incremented based on the presently considered user having visited the particular location.

However, if it is determined at (314) that the viewer is a permitted viewer for at least one location signal that is included in the set of location signals identified at (308) and that is associated with the presently considered user, then method (300) can proceed to (316).

At (316) it can be determined whether an associative link exists between the presently considered user and the viewer. For example, an associative link can be drawn between the a user and the viewer if the viewer follows the user in one or more social media platforms, if the viewer and the user are frequently tagged together in the same postings, if the viewer and the user are members of one or more groups or associations present on a social media platform, if the viewer and the user frequently email each other, or if other data exists that indicates that the viewer is familiar with or interested in the user.

If it is determined at (316) that an associative link does not exist between the presently considered user and the viewer, then method (300) can proceed to (315) and increment an anonymous count. In particular, although the viewer may be permitted to view a location signal identifying the presently considered user as having visited the particular location, if the viewer is not familiar with or otherwise does not know the user, then presenting the user as a visitor to the location will not be helpful or otherwise meaningful to the viewer. After (315) method (300) can proceed to (320).

However, if it is determined at (316) that an associative link does exist between the presently considered user and the viewer, then method (300) can proceed to (318) and add the presently considered user to a list of users that are available for specific identification by the visitor history. In particular, if the viewer is both a permitted viewer for at least one location signal identifying the presently considered user as having visited the particular location and also familiar with such user, then identifying the presently considered user as having visited the particular location will be helpful or otherwise meaningful to the viewer. After (318) method (300) can proceed to (320).

At (320) it can be determined whether additional unconsidered users remain in the set of users identified at (310). If it is determined at (320) that one or more unconsidered users remain, then method (300) can return to (312) of FIG. 3A and consider the next user in the set of users. In such fashion, each user included in the set of users identified at (310) can be considered individually.

However, referring again to FIG. 3B, if it is determined at (320) that all users in the set of users identified at (310) have been considered, then method (300) can proceed to (322) and provide the viewer-specific visitor history for the particular location. In particular, in some implementations, the visitor history can specifically identify one or more of the users included in the list of users available for specific identification by the visitor history.

As an example, the visitor history can provide a facepile that includes a certain number of images associated with particular users from the list. For example, facepile can include up to six images or less depending on the number of users included in the list of users available for specific identification by the visitor history.

As another example, the visitor history can include the anonymous count or can include a global count that indicates a total number of users that have visited the particular location. For example, the number of users that are included in the list but not specifically identified by the visitor history can be added to the anonymous count to identify a number of other additional users that have visited the location in addition to the users specifically identified by the visitor history.

Figure 4:
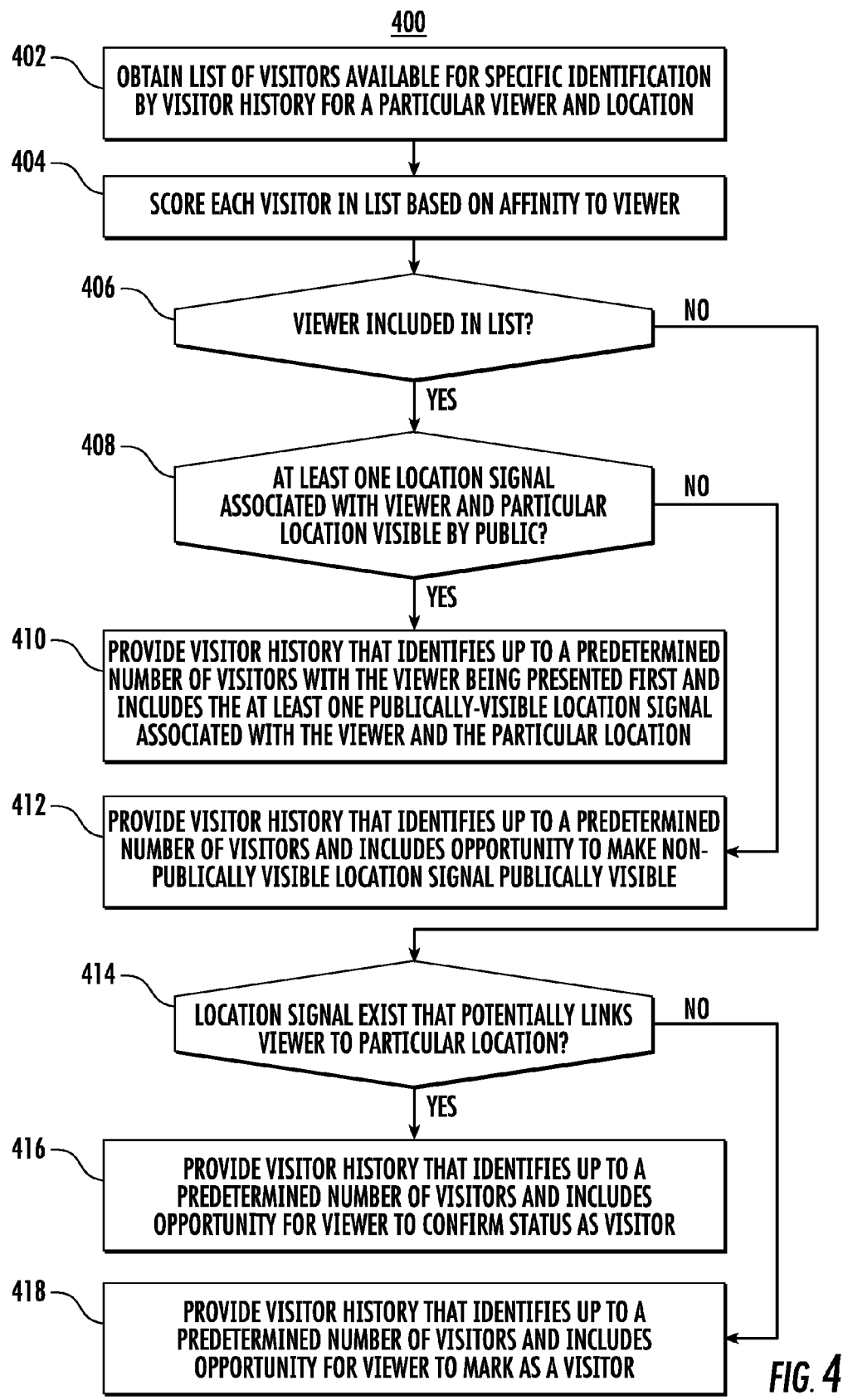
FIG. 4 depicts a flow chart of an exemplary method for providing a viewer-specific visitor history according to an exemplary embodiment of the present disclosure.

FIG. 4 depicts a flow chart of an exemplary method (400) for providing a viewer-specific visitor history according to an exemplary embodiment of the present disclosure. Method (400) can be implemented using any suitable computing system, including, for example, system 200 of FIG. 2.

In addition, although FIG. 4 depicts steps performed in a particular order for purposes of illustration and discussion, methods of the present disclosure are not limited to such particular order or arrangement. One skilled in the art, using the disclosures provided herein, will appreciate that various steps of the method (400) can be omitted, rearranged, combined, and/or adapted in various ways without deviating from the scope of the present disclosure.

At (402) a list of visitors that are available for specific identification by a visitor history for a particular viewer and location can be obtained. As an example, the list of visitors can include only users that have an associative link with the viewer and that are specified by at least one location signal that is associated with the particular location and that the viewer is permitted to view. For example, the list of users can have been generated by performing aspects of method (300) of FIGS. 3A and 3B.

At (404) each visitor included in the list can be scored based on an affinity to the viewer. As will be discussed further later, the affinity scores can be used to determine an order of presentation within a visitor history or other parameters. For example, a scoring function or formula can be implemented to provide an affinity score for each visitor.

As an example, in some implementations, the affinity score for each visitor can provide an indication of how much such visitor and the viewer interact with each other across a plurality of different web-services. Thus, visitors with which the viewer interacts more frequently or which data suggests are more familiar to the viewer can generally receive a larger affinity score.

As another example, in some implementations, the affinity score can be greater for visitors who are famous, well-renowned, or otherwise recognizable, so that such individuals and their associated social content are more prominently featured in the visitor history. For example, if a famous chef has visited and endorsed a particular restaurant, then the famous chef can receive a large affinity score and, therefore, be more prominently displayed within the visitor history.

At (406) it can be determined whether the viewer is included in the list obtained at (402). In particular, if one or more location signals exist that indicate that the viewer has previously visited the particular location, then the viewer can be included in a list of visitors that are available for specific identification by the visitor history. If the visitor is included in the list, then method (400) can proceed to (408).

Furthermore, method (400) is discussed in the context of an identified viewer who is currently logged in to a user account. If the viewer is unidentifiable or not logged in to an account, the viewer history provided to such viewer can include only an anonymous number of visitors or can specify only visitors associated with location signals that are visible by the public at large.

At (408) it can be determined whether at least one of the location signals associated with the viewer and the particular location are visible to the public. For example, the location signals associated with the viewer and the location may include a check-in that is visible to only a certain set of people and a review of the location that is publically visible. If it is determined at (408) that at least one of the location signals associated with the viewer and the particular location is visible to the public, then method (400) can proceed to (410).

At (410) a visitor history can be provided that identifies up to a predetermined number of visitors with the viewer being presented first. The visitor history can also include a summary of the at least one location signal associated with the viewer and the particular location that is visible to the public.

Figure 5:
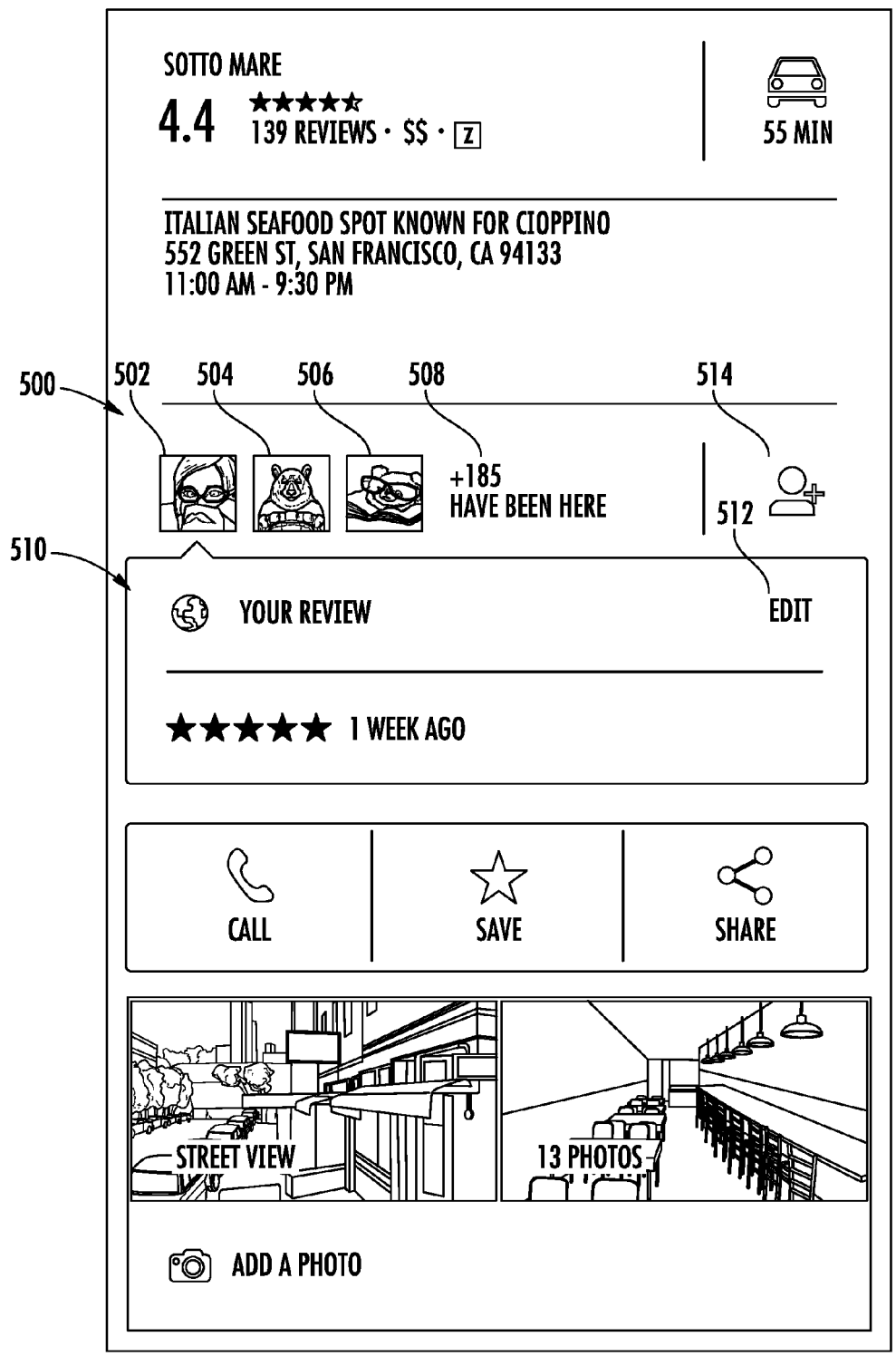
FIG. 5 depicts an exemplary viewer-specific visitor history according to an exemplary embodiment of the present disclosure.

As an example, FIG. 5 depicts an exemplary viewer-specific visitor history 500 according to an exemplary embodiment of the present disclosure. Visitor history 500 includes a plurality of images respectively corresponding to a plurality of visitors. In particular, a first image 502 that is presented can be associated with the viewer, because the viewer has visited the location. The second and third images 504 and 506 can be the two visitors that have received the highest affinity scores. In such fashion, the most relevant visitors (e.g. the viewer and those visitors that received the highest affinity scores) are presented most prominently.

While visitor history 500 includes only three images associated with three visitors, it will be appreciated that any suitable number of images can be shown. As an example, in some implementations, up to six images can be included in the visitor history. Visitor history 500 can further include an additional count 508.

Furthermore, according to an aspect of the present disclosure, visitor history 500 can also include a summary 510 of at least one location signal associated with the viewer and the particular location that is visible to the public. In particular, summary 510 can summarize a publically visible review that was previously provided by the viewer. In such fashion, the viewer is immediately given notification of the reason why she is listed as a visitor.

The viewer can be provided with an opportunity to edit the review via button 512. Editing the review can include changing the score, the review text, or deleting the review altogether. In some implementations, if the review is the only location signal that links the viewer to the particular location, deletion of the review can result in the viewer being removed from the list of visitors and, as a result, the visitor history.

The viewer can also be provided with an opportunity to tag other users as having visited the location through use of button 514. Tags can be treated as location signals once confirmed by the tagged user.

Returning to FIG. 4, if it is determined at (408) that none of the location signals associated with the viewer and the particular location are visible to the public, then method (400) can proceed to (412). As an example, in the instance that the only location signal indicating that the viewer has visited the particular location is a check-in that is not publically visible, then it can be determined at (408) that none of the location signals associated with the viewer and the particular location are visible to the public.

At (412) a visitor history can be provided that identifies up to a predetermined number of visitors. The visitor history can also include an opportunity for the viewer to transform the one or more of the location signals that are not publically visible into a publically visible indication that the viewer has visited the particular location.

Figure 6:
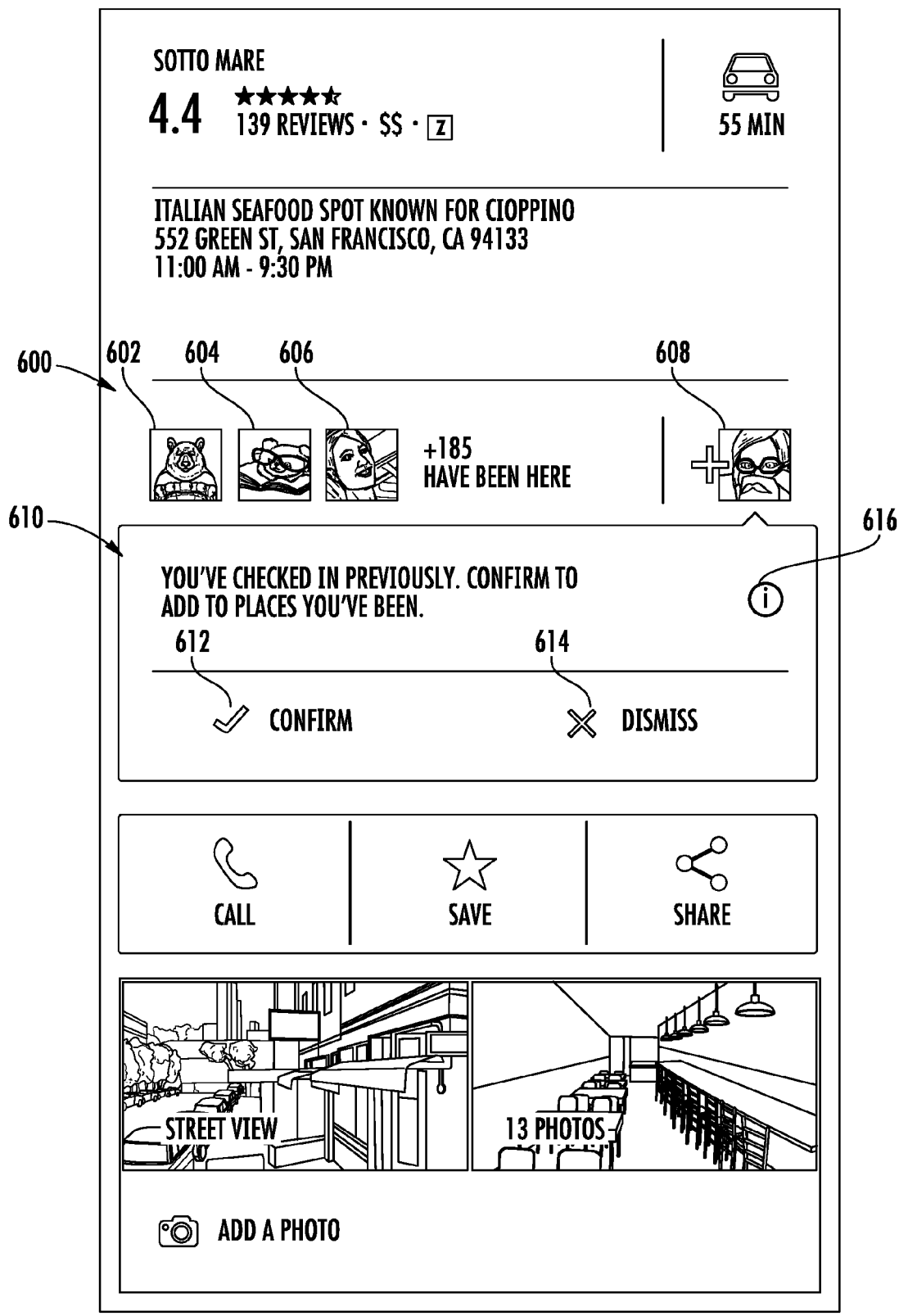
FIG. 6 depicts an exemplary viewer-specific visitor history according to an exemplary embodiment of the present disclosure.

As an example, FIG. 6 depicts an exemplary viewer-specific visitor history 600 according to an exemplary embodiment of the present disclosure. Visitor history 600 includes a plurality of images respectively corresponding to a plurality of visitors. For example, three images 602, 604, and 606 can be shown that correspond to the three visitors that received the highest affinity scores. The viewer can also be provided with an opportunity to indicate that she has visited the location via button 608.

In addition, visitor history 600 can include portion 610 which provides an opportunity to transform a location signal with visibility restrictions into a publically visible indication that the viewer has visited the location. In particular, the viewer has previously checked-in to the location, but such location signal may not be publically visible. The viewer can either confirm via button 612 or dismiss via button 614 the opportunity to transform such check-in into a publically visible indication that she has visited the location. Button 616 can be selected to receive additional information concerning the operation of portion 610 and/or the check-in referenced by portion 610.

Returning to FIG. 4, if it is determined at (406) that the viewer is not included in the list, then method (400) can proceed to (414) and determine whether a location signal exists that indicates that the viewer has potentially visited the particular location. For example, location signals can be received from web-services that provide only an indication that the viewer has potentially visited a particular location.

As an example, if the viewer has been tagged by another user as having visited a particular location, then confirmation can be sought from the viewer prior to treating such tagging as a reliable location signal. As another example, if device location updates from the viewer suggest that the viewer has been to the particular location, then confirmation can be sought from the viewer prior to treating such location update as a verified location signal. As yet another example, if photographs uploaded by the viewer include imagery or textual annotations which suggest that the viewer has been to the particular location, then confirmation can be sought from the viewer prior to treating such location update as a verified location signal.

If it is determined at (414) that one or more location signals exist that indicate that the viewer has potentially visited the particular location, then method (400) can proceed to (416).

At (416) a visitor history can be provided that identifies up to a predetermined number of visitors. The visitor history can also include an opportunity for the viewer to confirm her status as a visitor.

Figure 7:
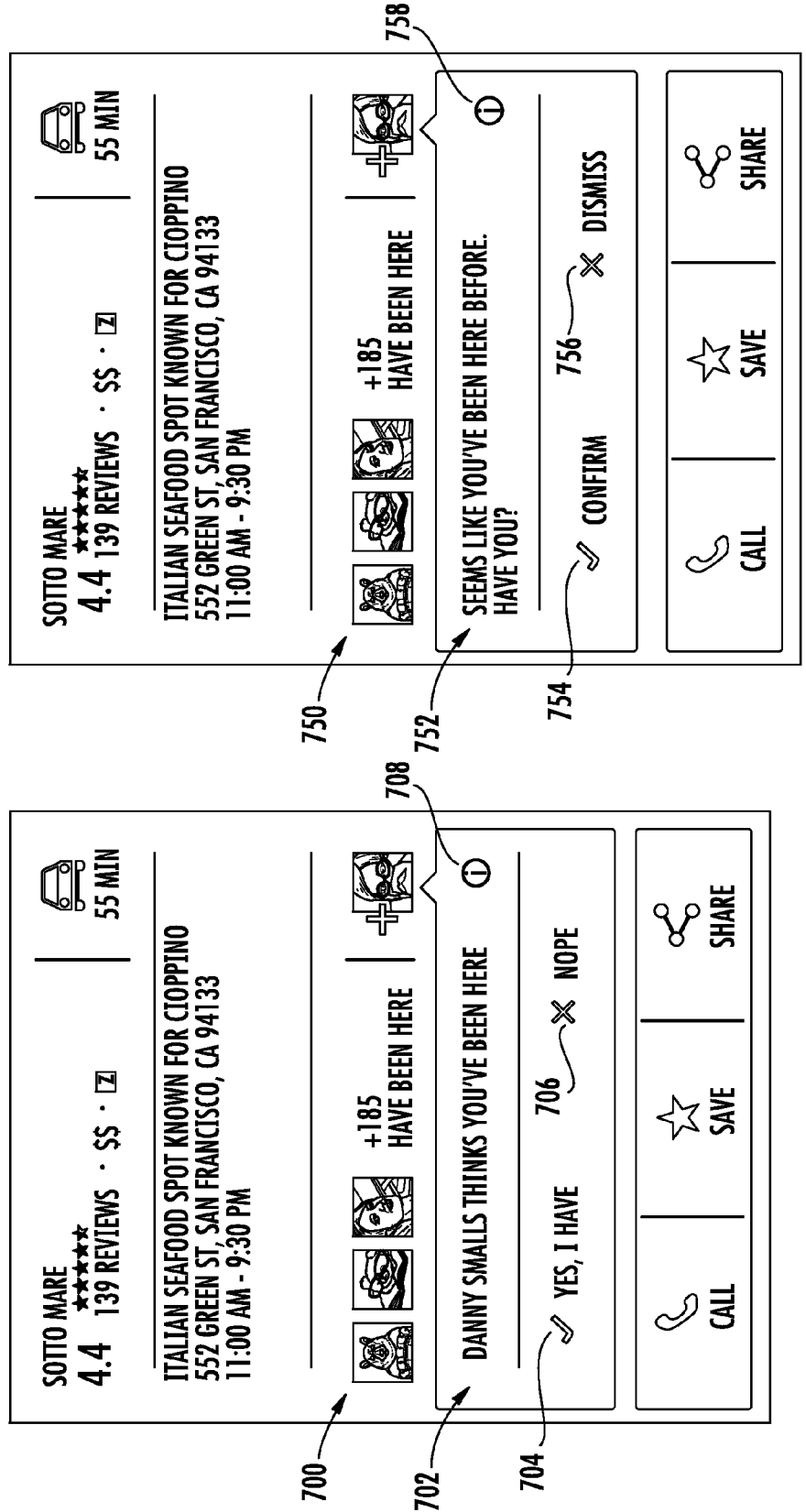
FIGS. 7A and 7B depict exemplary viewer-specific visitor histories according to an exemplary embodiment of the present disclosure.

As examples, FIGS. 7A and 7B depict exemplary viewer-specific visitor histories 700 and 750 according to an exemplary embodiment of the present disclosure. Visitor history 700 includes a portion 702 that provides an opportunity for the viewer to confirm her status as a previous visitor to the particular location. In particular, the viewer has previously been tagged by a contact ("Danny Smalls") as having previously visited the location.

Thus, a location signal exists that indicates that the viewer has potentially visited the location. The viewer can confirm via button 704 or deny via button 706 the tagging and her status as a visitor to the location. The viewer can also obtain more information by selecting button 708, such as, for example, privacy policies or controls, an indication of when and how Danny Smalls tagged the viewer, or other helpful information.

Likewise, visitor history 750 includes a portion 752 that provides an opportunity for the viewer to confirm her status as a previous visitor to the location. For example, the viewer may have uploaded pictures of the interior of the restaurant to a photograph storage service. Thus, a location signal exists that indicates that the viewer has potentially visited the location. The viewer can confirm via button 754 or deny via button 756 her status as a visitor to the location. The viewer can also obtain more information by selecting button 758.

Returning to FIG. 4, if it is determined at (414) that no location signals exist that potentially link the viewer to the particular location, then method (400) can proceed to (418).

At (418) a visitor history can be provided that identifies up to a predetermined number of visitors. The visitor history can also include an opportunity for the viewer to mark herself as a visitor. For example, the visitor history can be presented in a format similar or identical to that illustrated by visitor history 100 of FIG. 1.

Figure 8:
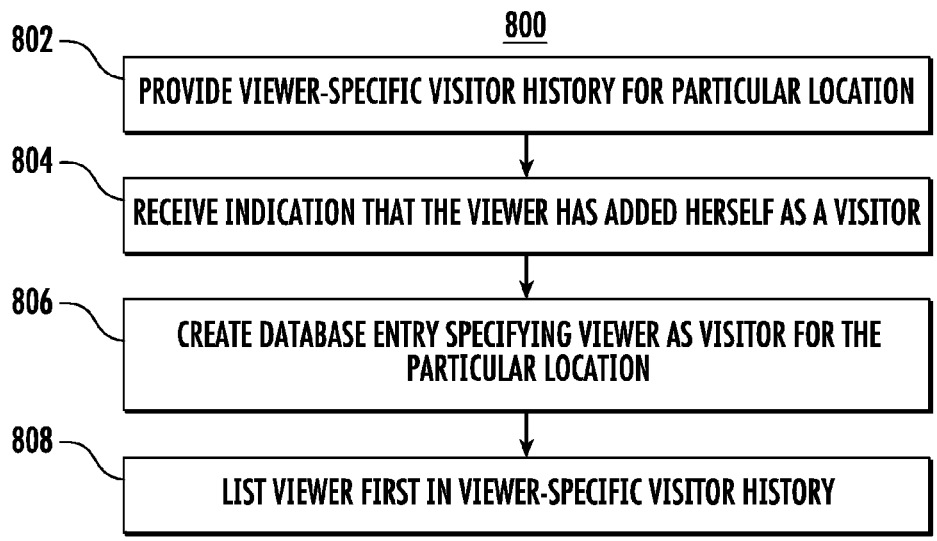
FIG. 8 depicts a flow chart of an exemplary method for providing a viewer-specific visitor history according to an exemplary embodiment of the present disclosure.

FIG. 8 depicts a flow chart of an exemplary method (800) for providing a viewer-specific visitor history according to an exemplary embodiment of the present disclosure. Method (800) can be implemented using any suitable computing system, including, for example, system 200 of FIG. 2.

In addition, although FIG. 8 depicts steps performed in a particular order for purposes of illustration and discussion, methods of the present disclosure are not limited to such particular order or arrangement. One skilled in the art, using the disclosures provided herein, will appreciate that various steps of the method (800) can be omitted, rearranged, combined, and/or adapted in various ways without deviating from the scope of the present disclosure.

At (802) a viewer-specific visitor history can be provided for a particular location. As an example, the visitor history can be generated and formatted according to methods (300) and (400) of FIGS. 3A, 3B, and 4. The visitor history can be displayed to a viewer on a display of a user computing device.

At (804) an indication can be received that the viewer has added herself as a visitor. For example, the visitor history can provide a button or other tool by which the viewer an indicate or confirm that she has visited the location. The tool can be selected, pressed, hovered over with a cursor, swiped, or other actions to indicate that the viewer is adding herself as a visitor.

At (806) a database entry can be created that specifies the viewer as a visitor for the particular location. For example, the indication received at (804) can be treated as a location signal and a database entry can be created in a location signal database. The visibility information for the database can be a default visibility for all indications received via visitor histories across all users, can be a default visibility set by the viewer for all indications provided via visitor histories, or can be a specific scope of visibility set or otherwise adjusted by the viewer for the particular location.

At (808) the visitor history can be adjusted such that the viewer is listed first. In other words, the viewer can be added as a visitor and prominently displayed.

Figure 10:
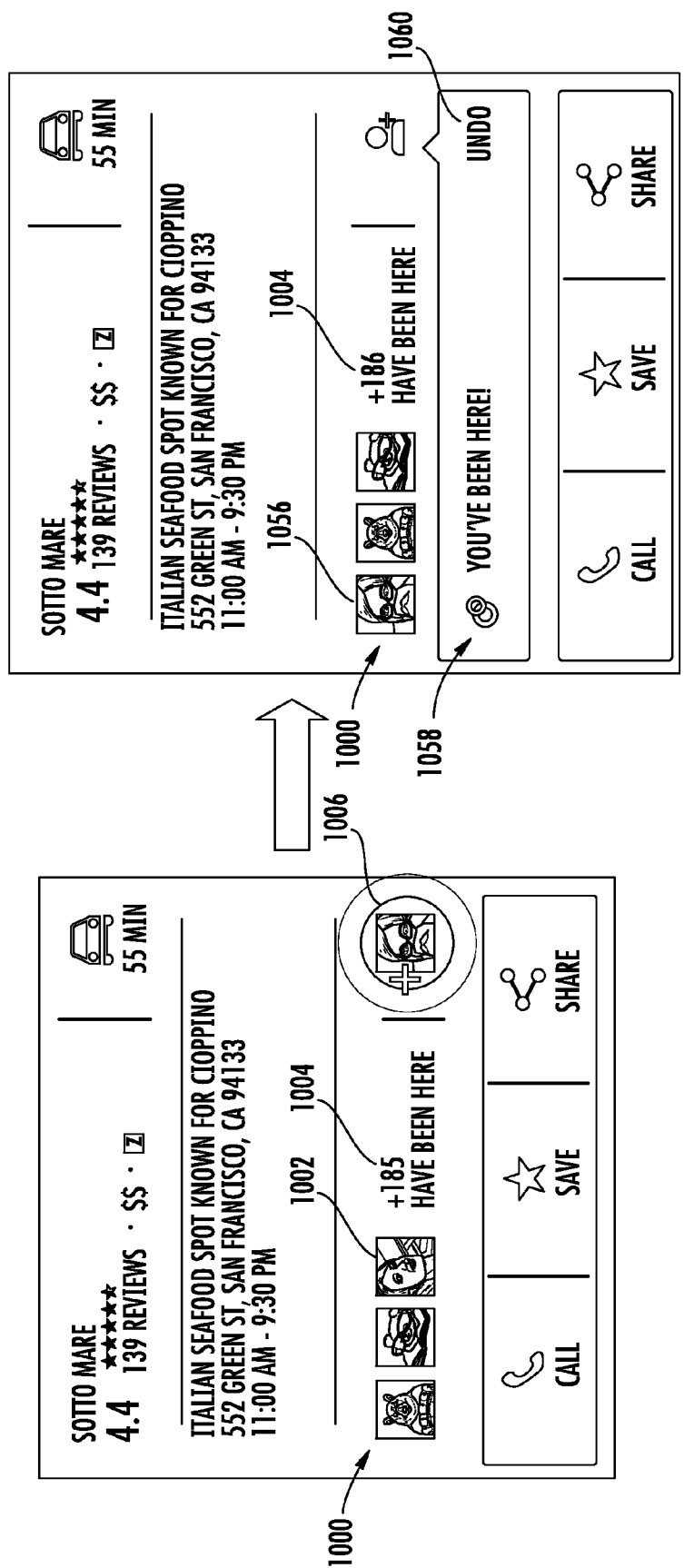
FIG. 10 depicts an exemplary viewer-specific visitor history according to an exemplary embodiment of the present disclosure.

As an example, FIG. 10 depicts an exemplary viewer-specific visitor history 1000 according to an exemplary embodiment of the present disclosure. In particular, visitor history 1000 can include a plurality of images, such as image 1002, that are respectively associated with a plurality of visitors to the particular location. Visitor history 1000 can also include an additional count 1004 and a tool 1006 by which the viewer can indicate that she has visited the particular location.

More particularly, as shown in FIG. 10, the viewer has selected tool 1006 to indicate that she has visited the location. As a result, an image 1056 associated with the viewer has been added to the facepile and has displaced image 1002. As a further result, the additional count 1004 has been incremented and a message 1058 has been provided to indicate the outcome of the viewer's selection of tool 1006. The viewer can also be provided with an opportunity to undo this action via button 1060.

Figure 9:
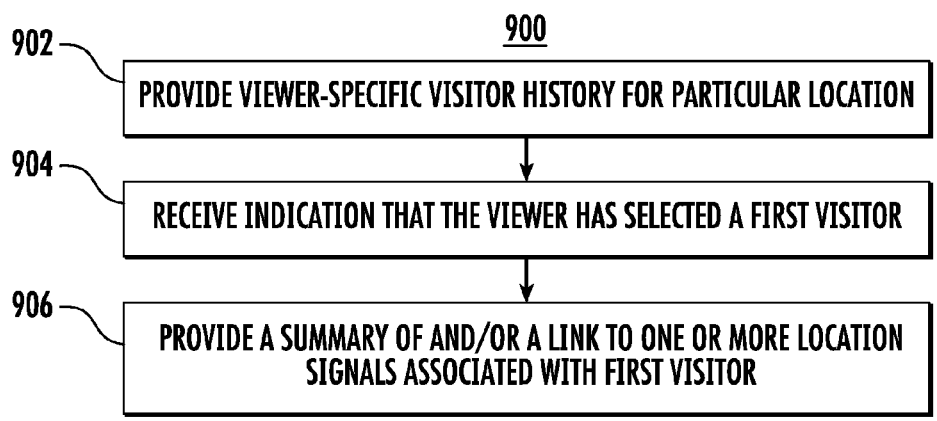
FIG. 9 depicts a flow chart of an exemplary method for providing a viewer-specific visitor history according to an exemplary embodiment of the present disclosure.

FIG. 9 depicts a flow chart of an exemplary method (900) for providing a viewer-specific visitor history according to an exemplary embodiment of the present disclosure. Method (900) can be implemented using any suitable computing system, including, for example, system 200 of FIG. 2.

In addition, although FIG. 9 depicts steps performed in a particular order for purposes of illustration and discussion, methods of the present disclosure are not limited to such particular order or arrangement. One skilled in the art, using the disclosures provided herein, will appreciate that various steps of the method (900) can be omitted, rearranged, combined, and/or adapted in various ways without deviating from the scope of the present disclosure.

At (902) a viewer-specific visitor history can be provided for a particular location. As an example, the visitor history can be generated and formatted according to methods (300) and (400) of FIGS. 3A, 3B, and 4. The visitor history can be displayed to a viewer on a display of a user computing device.

At (904) an indication can be received that the viewer has selected a first identified visitor. For example, the viewer can have selected, pressed, hovered over with a cursor, or swiped one of the images associated with an identified visitor.

At (906) a summary of and/or a link to one or more location signals associated with the selected visitor can be provided or displayed.

As an example, FIG. 11 depicts an exemplary viewer-specific visitor history 1100 according to an exemplary embodiment of the present disclosure. In particular, visitor history 1100 can include a plurality of images, such as image 1102, that are respectively associated with a plurality of visitors to the particular location.

More particularly, as shown in FIG. 11, the viewer has selected image 1102. As a result, a summary 1152 of a location signal associated with the visitor represented by image 1102 has been provided. The viewer must be a permitted viewer for a location signal in order for the summary 1152 of such location signal to be provided.

In the instance that summary 1152 is a summary of a review, summary 1152 can include a score 1154, a textual component 1156, and a date 1158 that the review was provided.

Figure 12:
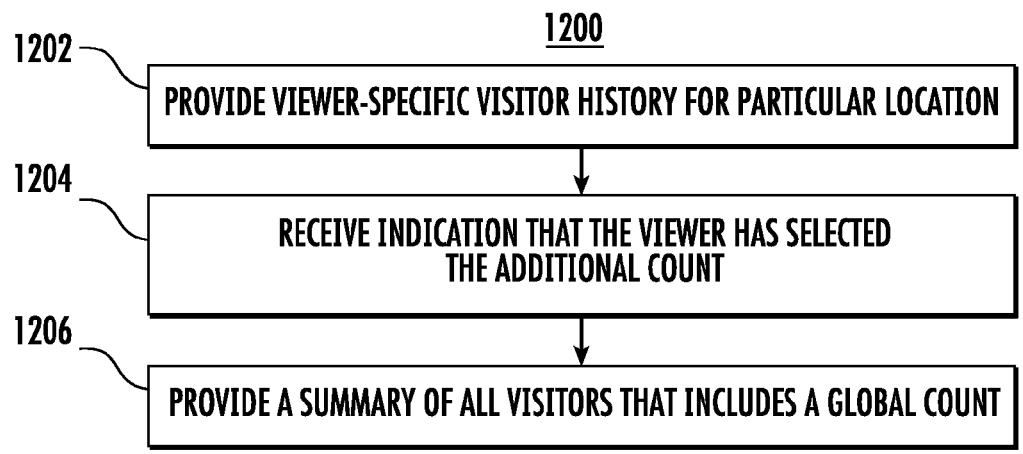
FIG. 12 depicts a flow chart of an exemplary method for providing a viewer-specific visitor history according to an exemplary embodiment of the present disclosure.

FIG. 12 depicts a flow chart of an exemplary method (1200) for providing a viewer-specific visitor history according to an exemplary embodiment of the present disclosure. Method (1200) can be implemented using any suitable computing system, including, for example, system 200 of FIG. 2.

In addition, although FIG. 12 depicts steps performed in a particular order for purposes of illustration and discussion, methods of the present disclosure are not limited to such particular order or arrangement. One skilled in the art, using the disclosures provided herein, will appreciate that various steps of the method (1200) can be omitted, rearranged, combined, and/or adapted in various ways without deviating from the scope of the present disclosure.

At (1202) a viewer-specific visitor history can be provided for a particular location. As an example, the visitor history can be generated and formatted according to methods (300) and (400) of FIGS. 3A, 3B, and 4. The visitor history can be displayed to a viewer on a display of a user computing device.

At (1204) an indication can be received that the viewer has selected the additional count. For example, the visitor history provided at (1202) can provide an additional count indicating a number of additional people that have visited the particular location in addition to those specifically identified by the visitor history.

At (1206) a summary of all visitors can be provided. In particular, a global count that indicates the total number of users that have visited the location can be provided in addition to specifically identifying a number of users and providing respective links to their social media profiles.

Figure 14:
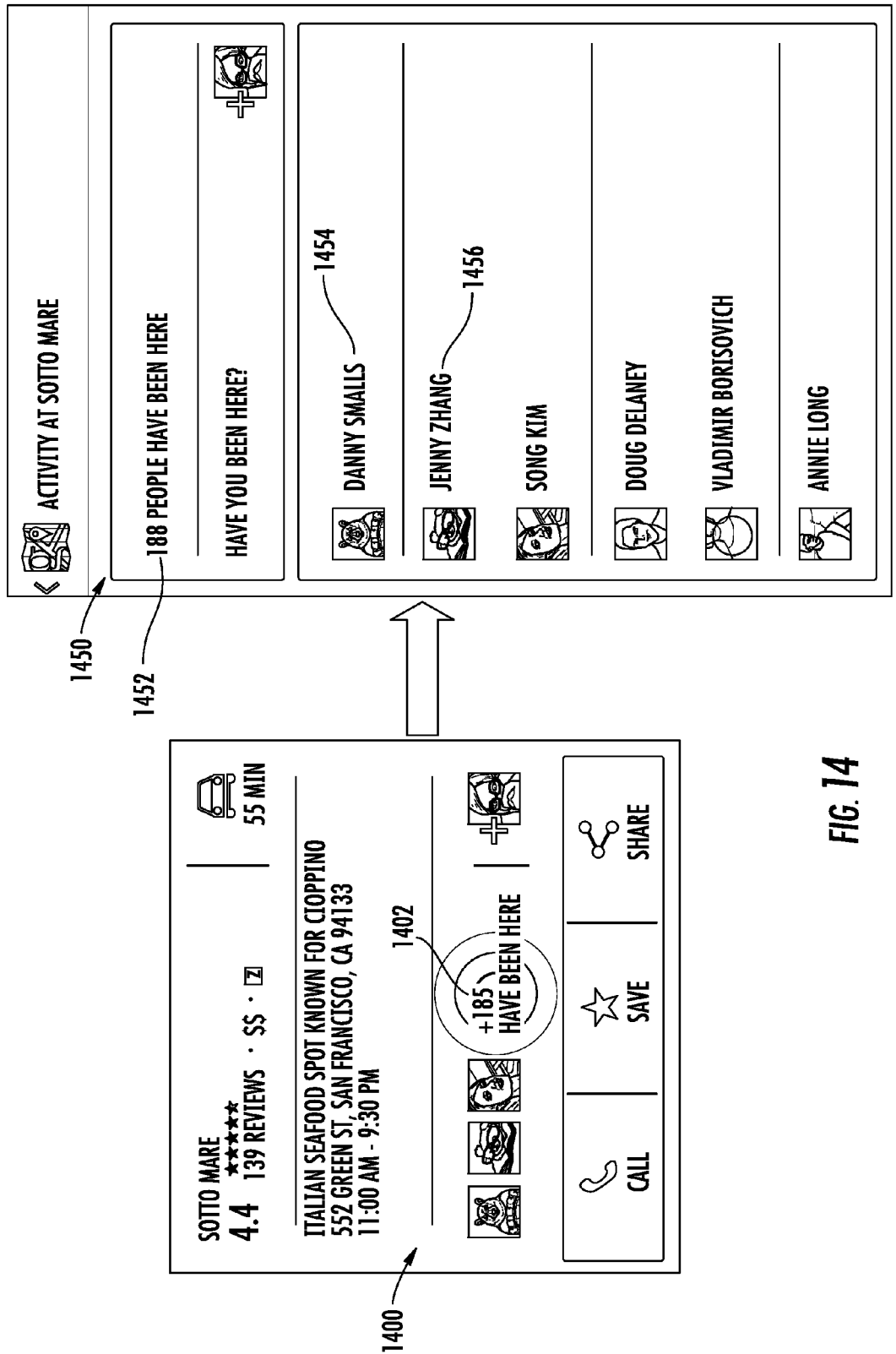
FIG. 14 depicts an exemplary viewer-specific visitor history according to an exemplary embodiment of the present disclosure.

As an example, FIG. 14 depicts an exemplary viewer-specific visitor history 1400 according to an exemplary embodiment of the present disclosure. More particularly, as shown in FIG. 14, the viewer has selected additional count 1402. As a result, a summary 1450 of all visitors can be provided. In particular, summary 1450 can provide a global count 1452 and specifically identify a plurality of visitors, such as, for example, visitors 1454 and 1456.

It will be understood that visitors will not be specifically identified by summary 1450 unless they meet the criteria for specific identification within visitor history 1400. In some implementations, the viewer can be redirected to a social media profile associated with a visitor by clicking, pressing, or otherwise selecting the portion of summary 1450 where the visitor is specifically identified. The number of visitors specifically identified by summary 1450 can be up to a predetermined number (e.g. six) or can be limitless.

Furthermore, while method (1200) discusses selection by the viewer of an additional count included in the viewer-specific visitor history, it will be understood that, in some implementations, the viewer-specific visitor history can include a global count rather than an additional count. Thus, in such implementations, selection of the global count can result in a summary of all visitors being provided, for example, as shown by summary 1450 of FIG. 14.

Figure 13:
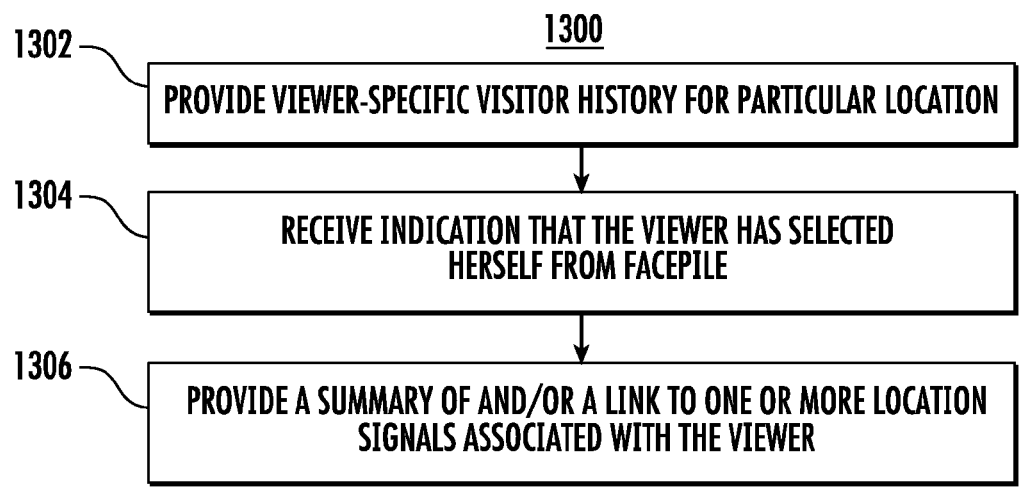
FIG. 13 depicts a flow chart of an exemplary method for providing a viewer-specific visitor history according to an exemplary embodiment of the present disclosure.

FIG. 13 depicts a flow chart of an exemplary method (1300) for providing a viewer-specific visitor history according to an exemplary embodiment of the present disclosure. Method (1300) can be implemented using any suitable computing system, including, for example, system 200 of FIG. 2.

In addition, although FIG. 13 depicts steps performed in a particular order for purposes of illustration and discussion, methods of the present disclosure are not limited to such particular order or arrangement. One skilled in the art, using the disclosures provided herein, will appreciate that various steps of the method (1300) can be omitted, rearranged, combined, and/or adapted in various ways without deviating from the scope of the present disclosure.

At (1302) a viewer-specific visitor history can be provided for a particular location. As an example, the visitor history can be generated and formatted according to methods (300) and (400) of FIGS. 3A, 3B, and 4. The visitor history can be displayed to a viewer on a display of a user computing device.

At (1304) an indication can be received that the viewer has selected herself from a facepile included in the visitor history. For example, the viewer can have previously left a review of the particular location and, as a result, can be specifically identified as a previous visitor of the location by the visitor history. Thus, at (1304) an indication can be received that the viewer has selected her image from the facepile.

At (1306) a summary and/or link to one or more location signals associated with the viewer can be provided. For example, a summary of the review that caused the viewer to be specifically identified as a previous visitor to the location can be provided.

Figure 15:
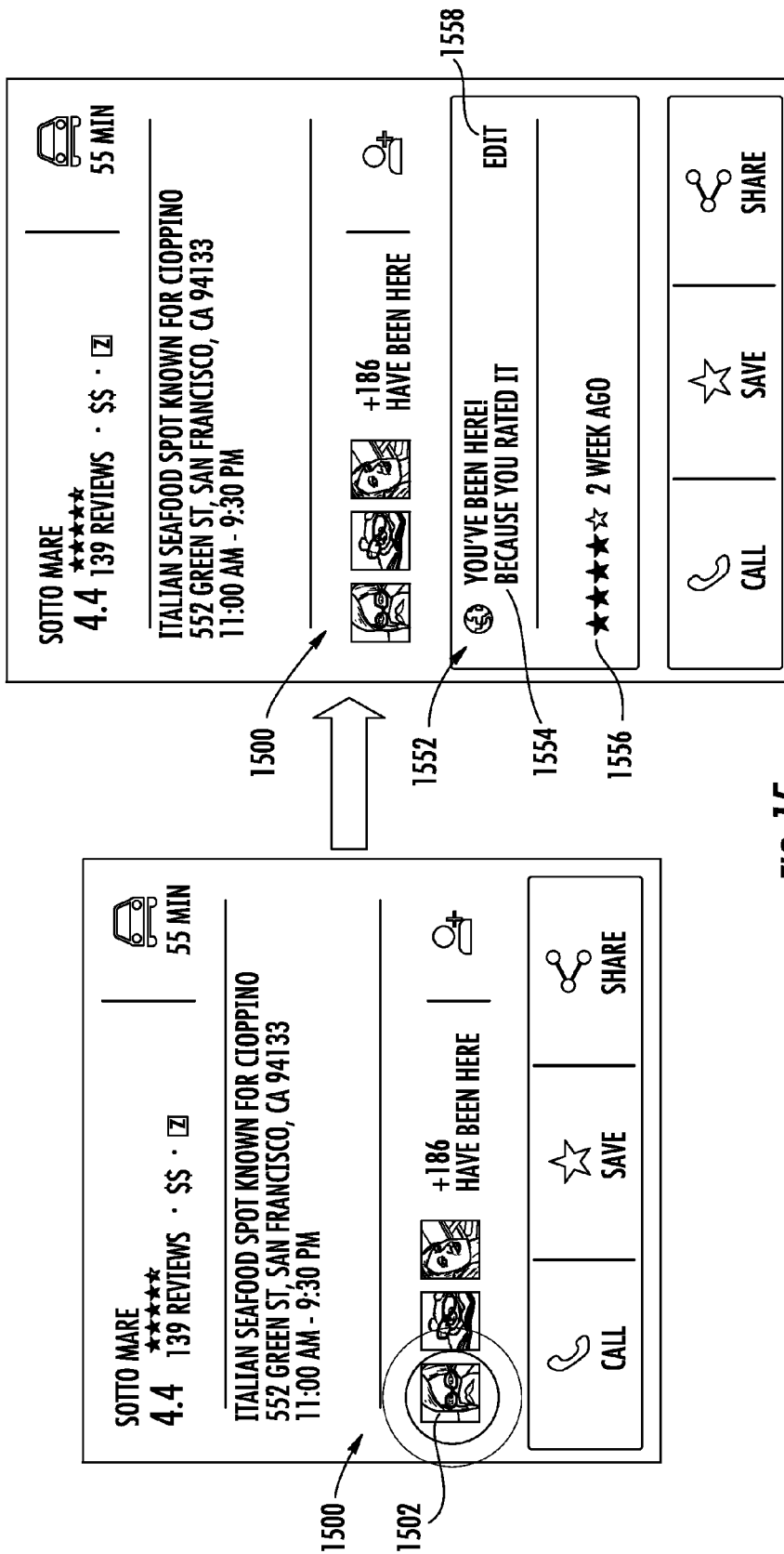
FIG. 15 depicts an exemplary viewer-specific visitor history according to an exemplary embodiment of the present disclosure.

As an example, FIG. 15 depicts an exemplary viewer-specific visitor history 1500 according to an exemplary embodiment of the present disclosure. More particularly, as shown in FIG. 15, the viewer has selected an image 1502 from the facepile that is representative of the viewer. As a result, a summary 1552 of a review that the viewer previously left is provided.

In particular, the summary 1552 can include a statement 1554 that the viewer has visited the location and that provides some context as to why the viewer is considered a previous visitor to the location (e.g. "Because you rated it"). Summary 1552 can further include a score 1556, a date, textual content of the review, or other information about the review. Summary 1552 can also provide an opportunity for the viewer to edit her status as a visitor through interaction with button 1558.

While the present subject matter has been described in detail with respect to specific example embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method comprising:
    obtaining, by one or more computing devices, a plurality of location signals from a plurality of different third party web-services;
    determining, by the one or more computing devices, a user, a given location, and visibility information associated with each of the plurality of location signals, wherein the visibility information associated with each of the plurality of location signals defines a set of permitted viewers that have an associative link with the user associated with that respective location signal and at least one of a scope of visibility selected by the user and a default visibility setting associated with the respective third party web-service from which the location signal was obtained of the plurality of different third party web-services, wherein determining the visibility information for each plurality of location signals comprises:
        determining, by the one or more computing devices, whether the user associated with the respective location signal specified the particular scope of visibility for the permitted viewers; and
        when it is determined that the user associated with the location signal did not specify the particular scope of visibility, obtaining, by the one or more computing devices, the default visibility setting associated with the respective third party web-service from which the location signal was obtained of the plurality of different third party web-services;
    receiving, by the one or more computing devices, a request for a viewer-specific visitor history for a particular viewer and a particular location;
    determining, by the one or more computing devices, a number of users that have visited the particular location based on the plurality of location signals, including the given locations associated with each of the plurality of location signals and whether one or more such given locations match the particular location;
    identifying a subset of the number of users, wherein the subset comprises those users associated with at least one location signal for which the particular viewer is a permitted viewer and that is associated with the particular location, and wherein the subset comprises only users that have an associative link with the particular viewer; and
    providing, by the one or more computing devices, the viewer-specific visitor history for display to the particular viewer, wherein the viewer-specific visitor history identifies one or more of the subset of the number of users.

2. The computer-implemented method of claim 1, wherein the viewer-specific visitor history comprises a facepile, and wherein the facepile comprises one or more images respectively associated with the one or more of the subset of the number of users.

3. The computer-implemented method of claim 1, wherein the plurality of location signals comprise one or more user-provided reviews and one or more check-ins.

4. The computer-implemented method of claim 1, wherein the plurality of different third party web-services comprise a plurality of different third-party web-services that use location-associated data.

5. The computer-implemented method of claim 1, wherein the associative link comprises the user being followed by the particular viewer in one or more social networking websites.

6. The computer-implemented method of claim 1, wherein determining, by the one or more computing devices, visibility information for each of the plurality of location signals further comprises:
    associating, by the one or more computing devices, the default visibility setting with the location signal.

7. The computer-implemented method of claim 1, wherein determining, by the one or more computing devices, the number of users that have visited the particular location based on the plurality of location signals comprises:
    identifying, by the one or more computing devices, all of the location signals associated with the particular location; and
    identifying, by the one or more computing devices, all of the users associated with the identified location signals associated with the particular location.

8. The computer-implemented method of claim 1, wherein identifying the subset of the number of users comprises:
    determining, by the one or more computing devices for each of the number of users, whether the particular viewer is a permitted viewer for at least one location signal associated with such user and the particular location;
    for each user for which it is determined that the particular viewer is a permitted viewer for at least one location signal associated with such user and the particular location, adding, by the one or more computing devices, such user to the subset of the number of users; and
    for each user for which it is determined that the particular viewer is not a permitted viewer for at least one location signal associated with such user and the particular location, incrementing, by the one or more computing devices, an anonymous visitor count.

9. The computer-implemented method of claim 1, wherein providing, by the one or more computing devices, the viewer-specific visitor history for display to the particular viewer comprises:
    determining, by the one or more computing devices, whether one or more location signals exist that indicates that the particular viewer has potentially visited the particular location; and when it is determined that one or more location signals exist that indicates that the particular viewer has potentially visited the particular location, providing, by the one or more computing devices, an opportunity within the viewer-specific visitor history for the particular viewer to confirm that the particular viewer has visited the particular location.

10. The computer-implemented method of claim 1, further comprising, after providing the viewer-specific visitor history for display to the particular viewer:
receiving, by the one or more computing devices, viewer input data indicating that the particular viewer has selected one of the one or more users identified by the viewer-specific visitor history; and
providing, by the one or more computing devices, a summary of at least one of the location signals associated with the selected user and the particular location in response to the viewer input data indicating that the particular viewer has selected the selected user of the one or more users identified by the viewer-specific visitor history.

11. The computer-implemented method of claim 1, further comprising, after providing the viewer-specific visitor history for display to the particular viewer:
receiving, by the one or more computing devices, viewer input data indicating that the particular viewer has indicated that the particular viewer has visited the particular location; and
adjusting, by the one or more computing devices, the viewer-specific visitor history in response to the viewer input data so that the particular viewer is specifically identified as having visited the particular location.

12. The computer-implemented method of claim 1, further comprising, after providing the viewer-specific visitor history for display to the particular viewer:
receiving, by the one or more computing devices, viewer input data indicating that the particular viewer has selected a visitor count included in the viewer-specific visitor history, wherein the visitor count provides an indication of the number of users that have visited the particular location; and
providing, by the one or more computing devices, a summary of the number of users that have visited the particular location in response to the viewer input data.

13. The computer-implemented method of claim 1, wherein the visibility information for each of the location signals comprises one or more access control list tags.

14. A computing system for generating a viewer-specific visitor history for a location, the computing system comprising:
at least one processor; and
a non-transitory computer-readable medium storing instructions that, when executed by the at least one processor, cause the computing system to perform operations, the operations comprising:
respectively generating, by the computing system, a plurality of database entries for a plurality of location signals respectively obtained from a plurality of third party web-services, wherein each database entry for each location signal specifies a user, a given location, and visibility information, wherein the visibility information for each database entry defines a set of permitted viewers that have an associative link with the user for that database entry and at least one of a scope of visibility selected by the user and a default visibility setting associated with the respective third party web-service from which the location signal was obtained of the plurality of different third party web-services, wherein determining the visibility information for each plurality of location signals comprises:
determining, by the computing system, whether the user associated with the respective location signal specified the particular scope of visibility for the permitted viewers; and
when it is determined that the user associated with the location signal did not specify the particular scope of visibility, obtaining, by the computing system, the default visibility setting associated with the respective third party web-service from which the location signal was obtained of the plurality of different third party web-services;
receiving, by the computing system, a request for the viewer-specific visitor history, wherein the request specifies a viewer and a particular location;
identifying, by the computing system, a set of database entries, wherein the set of database entries comprises all of the plurality of database entries that specify the particular location based at least in part on whether the given location for each respective database entry matches the particular location, wherein the set of database entries comprises only users that have an associative link with the viewer;
identifying, by the computing system, a set of users, wherein the set of users comprises each user that has an associative link with the viewer and that is specified by at least one of the set of database entries that the viewer is permitted to view according to the respective visibility information; and
generating, by the computing system, the viewer-specific visitor history for the particular location, wherein the viewer-specific visitor history identifies one or more of the set of users.

15. The computing system of claim 14, wherein the viewer-specific visitor history further provides an additional visitor count, wherein the additional visitor count comprises a number of unique users specified by at least one of the set of database entries but not identified by the viewer-specific visitor history.

16. The computing system of claim 14, wherein the non-transitory computer-readable medium stores further instructions that, when executed by the at least one processor, cause the computing system to perform further operations, the further operations comprising:
receiving, by the computing system, viewer input data indicating that the viewer has indicated through interaction with the viewer-specific visitor history that the viewer has visited the particular location; and
generating, by the computing system, an additional database entry in response to the viewer input data, wherein the additional database entry specifies the viewer and the particular location.

17. A computer-implemented method comprising:
determining, by one or more computing devices, a user, a given location, and visibility information associated with each of a plurality of location signals respectively associated with a plurality of third party web-services, wherein the visibility information associated with each location signal defines one or more users who are permitted to view such location signal and that have an associative link with the user associated with that respective location signal and at least one of a scope of visibility selected by the user and a default visibility setting associated with the respective third party web-service from which the location signal was obtained of the plurality of different third party web-services, wherein determining the visibility information for each plurality of location signals comprises:
- determining, by the one or more computing devices, whether the user associated with the respective location signal specified the particular scope of visibility the permitted viewers; and
- when it is determined that the user associated with the location signal did not specify the particular scope of visibility, obtaining, by the one or more computing devices, the default visibility setting associated with the respective web-service from which the location signal was obtained of the plurality of different third party web-services;

receiving, by the one or more computing devices, a request for a viewer-specific visitor history for an identified viewer and an identified location;

identifying, by the one or more computing devices, a subset of the plurality of location signals, the subset comprising all of the plurality of location signals that are associated with the identified location based at least in part on whether one or more given locations associated with the plurality of location signals match the identified location, wherein the subset comprises only users that have an associative link with the identified viewer;

identifying, by the one or more computing devices, a set of users associated with the subset of the plurality of location signals; and generating, by the one or more computing devices, the viewer-specific visitor history based on the set of users and the visibility information respectively associated with each of the subset of the plurality of location signals.

18. The computer-implemented method of claim 17, wherein generating, by the one or more computing devices, the viewer-specific visitor history based on the set of users and the visibility information respectively associated with the set of users comprises generating, by the one or more computing devices, the viewer-specific visitor history by performing operations for each user in the set of users, the operations comprising:
- determining, by the one or more computing devices based on the respective visibility information, whether the viewer is permitted to view at least one location signal associated with the user and the identified location;
- when it is determined that an associative link exists between the viewer and the user, adding, by the one or more computing devices, the user to a list of users available for specific identification by the viewer-specific visitor history; and
- when it is either determined that the viewer is not permitted to view at least one location signal associated with the user and the identified location or it is determined that an associative link does not exist between the viewer and the user, incrementing, by the one or more computing devices, an anonymous visitor count.

19. The computer-implemented method of claim 18, further comprising providing, by the one or more computing devices, the viewer-specific visitor history for display to the identified viewer, wherein the viewer-specific visitor history comprises a plurality of interactive features that permit the identified viewer to explore the list of users available for specific identification.

* * * * *